(12) United States Patent
Matsuda et al.

(10) Patent No.: US 11,541,542 B2
(45) Date of Patent: Jan. 3, 2023

(54) SERVICE PROVIDING SYSTEM, INFORMATION PROCESSING APPARATUS, AND METHOD OF CONTROLLING SERVICE PROVIDING SYSTEM

(71) Applicant: HITACHI, LTD., Tokyo (JP)

(72) Inventors: Tomohiro Matsuda, Tokyo (JP); Hideya Yoshiuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 937 days.

(21) Appl. No.: 16/381,022

(22) Filed: Apr. 11, 2019

(65) Prior Publication Data

US 2019/0329412 A1 Oct. 31, 2019

(30) Foreign Application Priority Data

Apr. 25, 2018 (JP) .............................. JP2018-084497

(51) Int. Cl.
*B25J 9/16* (2006.01)
(52) U.S. Cl.
CPC ........... *B25J 9/1671* (2013.01); *B25J 9/1607* (2013.01)
(58) Field of Classification Search
CPC ....... B25J 9/1671; B25J 9/1607; B25J 11/008
See application file for complete search history.

(56) References Cited

U.S. PATENT DOCUMENTS

2014/0142757 A1* 5/2014 Ziegler .................... B25J 19/06
901/1

FOREIGN PATENT DOCUMENTS

JP 2006-167840 A 6/2006
JP 2017-170568 A 9/2017

OTHER PUBLICATIONS

Japanese Office Action received in corresponding Japanese Application No. 2018-084497 dated Oct. 5, 2021.

* cited by examiner

*Primary Examiner* — Basil T. Jos
(74) *Attorney, Agent, or Firm* — Mattingly & Malur, PC

(57) ABSTRACT

A service providing system includes one or more robots and an information processing apparatus communicably connected to the robots. The information processing apparatus acquires analysis information based on information in an area in which the robot provides a service, acquires robot state information from the robot, stores service information as information on the service, acquires one or more service triggers based on the analysis information, calculates a service effect based on at least any one of service information of a service corresponding to each of a plurality of service triggers, the robot state information, and the information acquired in the service providing area, the service effect being an effect of the service corresponding to each of a plurality of service triggers, selects a service trigger depending on the service effect, and causes the robot as a service execution subject to execute a service corresponding to the selected service trigger.

14 Claims, 33 Drawing Sheets

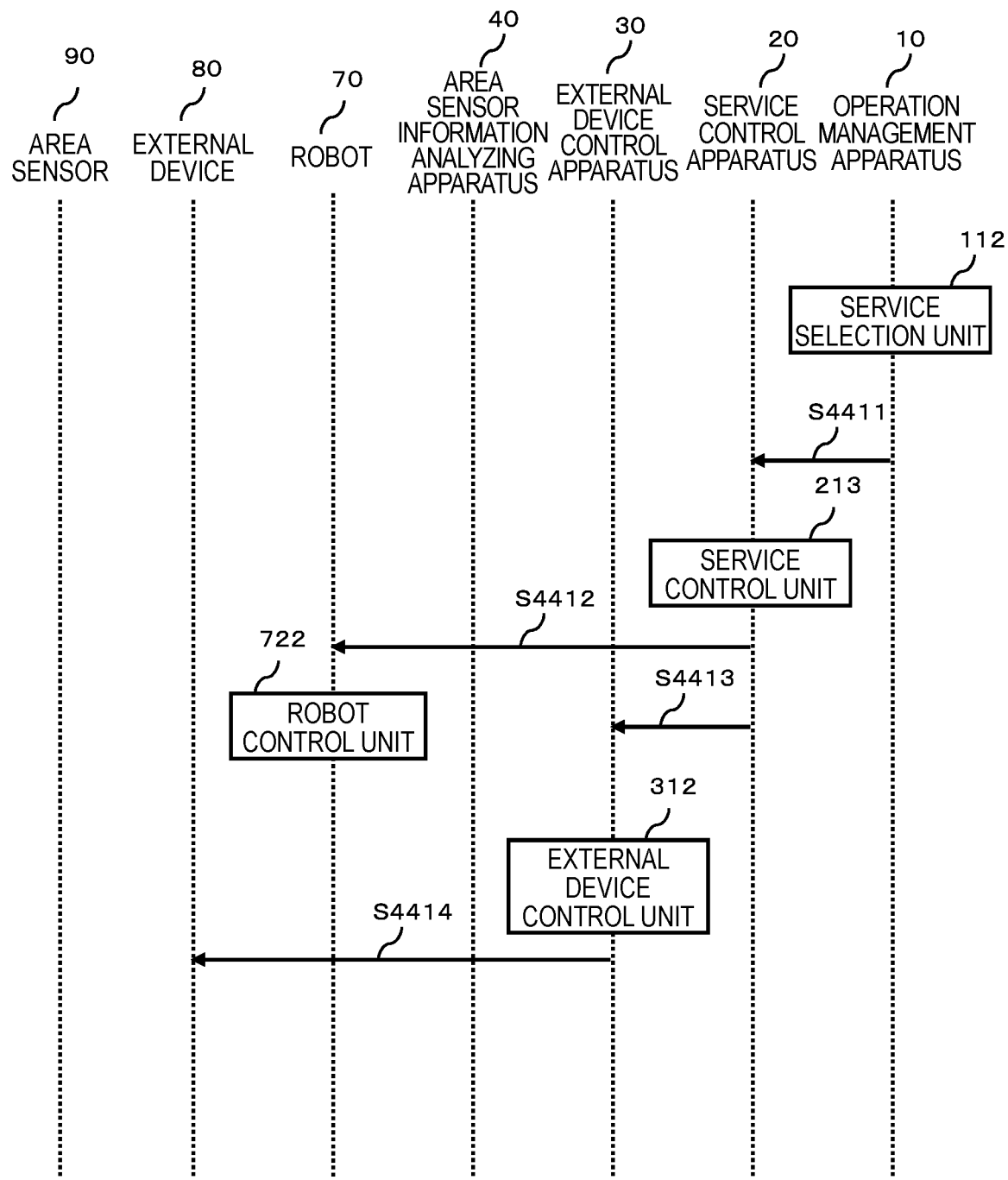

SERVICE PROVIDING SYSTEM, INFORMATION PROCESSING APPARATUS, AND METHOD OF CONTROLLING SERVICE PROVIDING SYSTEM

CROSS-REFERENCE TO RELATED APPLICATION

This application claims priority pursuant to Japanese patent application No. 2018-084497, filed on Apr. 25, 2018, the entire disclosure of which is incorporated herein by reference.

BACKGROUND

The present disclosure relates to a service providing system, an information processing apparatus, and a method of controlling the service providing system.

Japanese Unexamined Patent Application Publication No. 2017-170568, hereinafter "Patent document 1", discloses that "a service providing robot system capable of appropriately providing a service to a person waiting for provision of the service is provided", and "the service providing robot system uses a robot. The robot is remotely controlled by a computer. The computer determines a priority for service provision based on respective positional relationships of people acquired by a person tracking system, and provides a service to the robot according to the determined priority".

SUMMARY

Recently, development of a robot providing various services related to communication with people such as a conversation service, a guide service at the time of movement has been conducted. A robot having a function of providing a service to people is generally configured to be able to provide a plurality of services, and selects a service to be provided depending on the time and situation. In the robot which is capable of providing a plurality of services, timings (hereinafter, referred to as a service trigger) to provide a plurality of different services occur at the same time in some cases.

In Patent document 1, a computer determines a priority for service provision based on respective positional relationships of people acquired by a person tracking system, and provides a service to a robot according to the determined priority. However, for example, in a robot which is capable of providing a plurality of services such as reception of guests, guiding, and the like, triggers (hereinafter, referred to as a service trigger) to start, not a single service but the plurality of services, are generated at the same time in some cases. Therefore, it is necessary to determine a priority for service execution depending on contents of a service. Further, not at the same time, but another new service trigger is generated during provision of one service in some cases.

The present invention has been made in view of such a background. An object of the present invention is to provide a service providing system, an information processing apparatus, and a method of controlling the service providing system, which are capable of causing a robot to execute an appropriate service when a plurality of service triggers are generated.

An aspect of the present invention provides a service providing system including: one or more robots which execute a service; and an information processing apparatus which is communicably connected to the robots, wherein the information processing apparatus includes a robot state information acquisition unit which acquires, from the robot, robot state information as information indicating a state of the robot, an analysis information acquisition unit which acquires analysis information as information based on information acquired in an area in which the robot provides the service, a storage unit which stores service information as information on the service, a service trigger collection unit which acquires a service trigger as information indicating a trigger for executing the service based on the analysis information, a service effect calculation unit which calculates a service effect based on at least any one of service information of a service corresponding to each of a plurality of service triggers, the robot state information, and the information acquired in the area in which the service is provided, the service effect being an effect of the service corresponding to each of a plurality of service triggers, a service selection unit which selects a service trigger depending on the service effect, and a service control unit which causes the robot as a service execution subject to execute a service corresponding to the selected service trigger.

According to the teaching herein, it is possible to cause a robot to execute an appropriate service when a plurality of service triggers are generated.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF DRAWINGS

FIG. 44 is a sequence diagram for describing a service execution sequence.

DETAILED DESCRIPTION OF THE EMBODIMENTS

Figure 1:
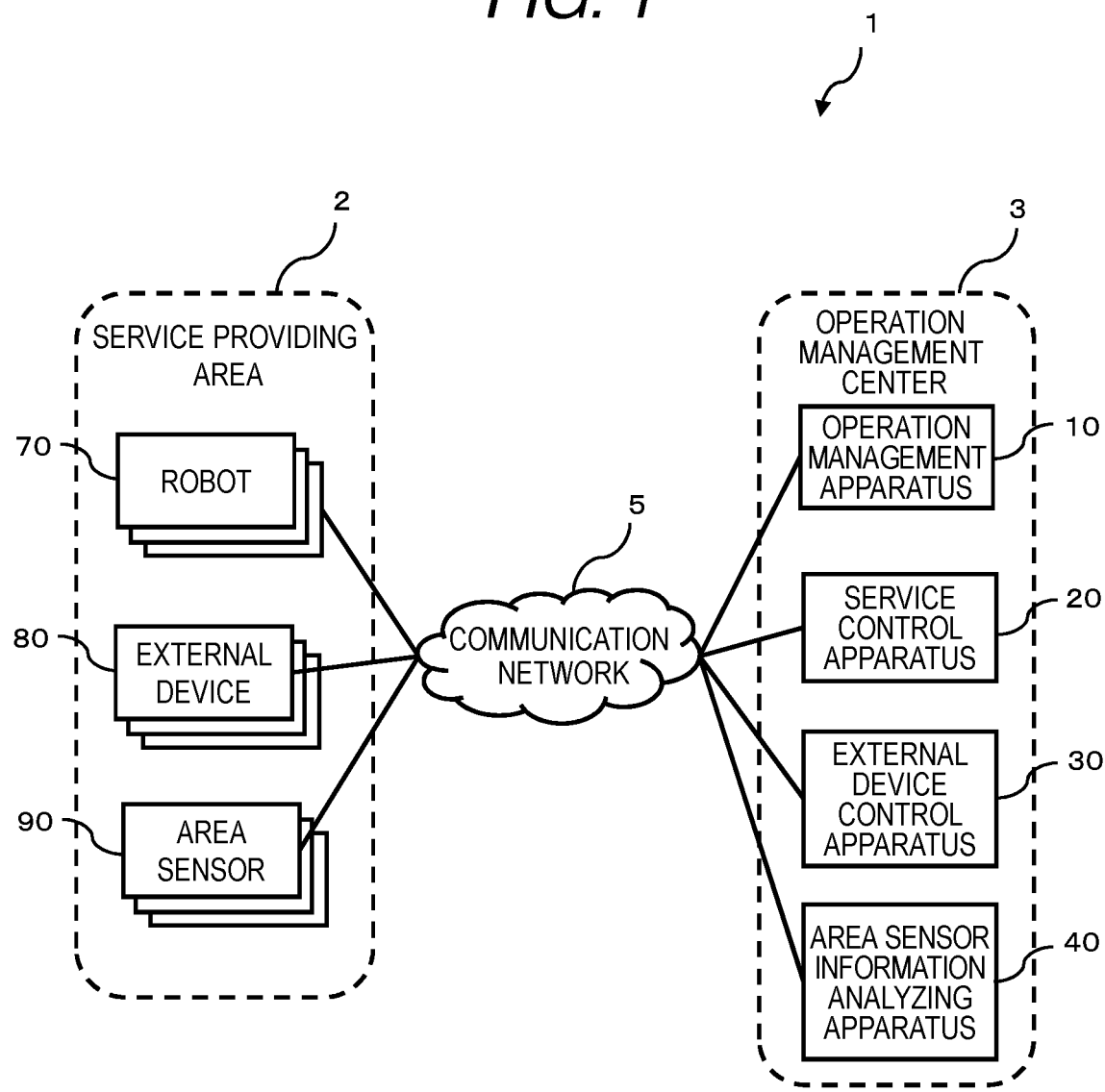
FIG. 1 is a diagram showing a schematic configuration of a service providing system.

Hereinafter, an embodiment will be described with reference to the accompanying drawings. In the following description, the same or similar component is denoted by the same reference numeral and an overlapping description thereof will be omitted.

FIG. 1 shows a schematic configuration of a service providing system 1 according to an embodiment of the present invention. As shown in FIG. 1, the service providing system 1 includes one or more robots 70, one or more external devices 80, and one or more area sensors 90 which are present in a service providing area 2, an operation management apparatus 10, a service control apparatus 20, an external device control apparatus 30, and an area sensor information analyzing apparatus 40 which are present in an operation management center 3 of the service providing system 1.

As shown in FIG. 1, the respective devices provided in the service providing area 2 and the operation management center 3 are communicably connected to one another via a communication network 5. The communication network 5 is communication means in a wired manner or a wireless manner, and is, for example, the Internet, a dedicated line, or a local communication network (local area network (LAN), wide area network (WAN), short-distance wireless communication, or the like) provided in the service providing area 2 and the operation management center 3.

The robot 70 is a humanoid robot which is able to provide various services (reception of guests, guiding, translation, nursing, conversation, and the like) to people and autonomously move, but a shape, a configuration, and a function of the robot 70 are not necessarily limited. For example, the robot 70 may be an unmanned vehicle (drone), an autonomous vehicle, or the like. The robot 70 includes a sensor (various sensors 79 to be described later) which outputs information (hereinafter, referred to as robot sensor information) which causes generation of a trigger for starting provision of a service. The robot 70 frequently transmits the robot sensor information to the service control apparatus 20 via the communication network 5.

The external device 80 is a device which is present in the service providing area 2, other than the robot 70, and is, for example, a device which is capable of being electronically controlled by the operation management center 3, such as a digital signage, a camera, an elevator, an air conditioner, a smartphone, a portable computer, or the like. The external device 80 can provide a service in the service providing area 2 when the robot 70 provides a service. The external device 80 frequently transmits information on a state of the external device 80 itself to the external device control apparatus 30.

Examples of the area sensor 90 include a distance sensor, a vibration sensor, an acoustic sensor (microphone), a temperature sensor, and the like which are installed at various positions in the service providing area 2. The area sensor 90 is an apparatus which outputs various kinds of information (hereinafter, referred to as area sensor information) acquired in the service providing area 2. The area sensor 90 frequently transmits the area sensor information to the area sensor information analyzing apparatus 40 via the communication network 5.

All of the operation management apparatus 10, the service control apparatus 20, the external device control apparatus 30, and the area sensor information analyzing apparatus 40 provided in the operation management center 3 function as an information processing apparatus (computer).

The operation management apparatus 10 collects information from a device which is present in the service providing area 2, selects a service to be provided by the robot 70, and transmits control information for the robot 70 to the service control apparatus 20.

The service control apparatus 20 collects the service trigger described above based on information obtained by analyzing the robot sensor information transmitted from the robot 70, information obtained by analyzing the information on a state of the external device 80 or the like transmitted from the external device control apparatus 30, and information transmitted from the area sensor information analyzing apparatus 40 (hereinafter, the information acquired in the service providing area 2 will be collectively referred to as analysis information). In addition, the service control apparatus 20 controls the robot 70 or the external device 80 based on control information received from the operation management apparatus 10.

The external device control apparatus 30 transmits analysis information obtained by analyzing the information (hereinafter, referred to as external device information) received from the external device 80 to the service control apparatus 20. In addition, the external device control apparatus 30 controls the external device 80 based on the control information received from the service control apparatus 20.

The area sensor information analyzing apparatus 40 transmits analysis information obtained by analyzing the area sensor information received from the area sensor 90 to the service control apparatus 20.

Figure 2:
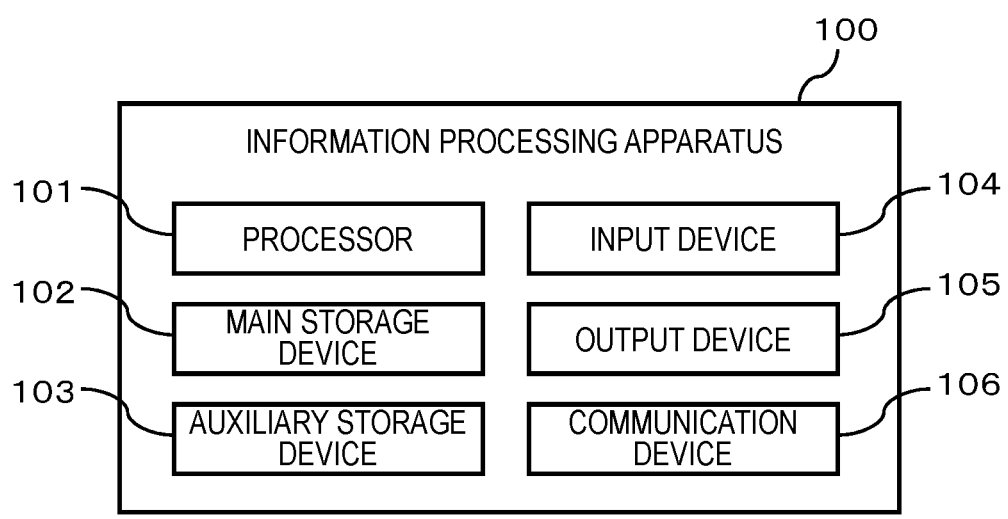
FIG. 2 is a diagram showing an example of a hardware configuration of an information processing apparatus which implements functions of an operation management apparatus, a service control apparatus, an external device control apparatus, and an area sensor information analyzing apparatus.

FIG. 2 shows an example of a hardware configuration of an information processing apparatus (computer) which implements functions of the operation management apparatus 10, the service control apparatus 20, the external device control apparatus 30, and the area sensor information analyzing apparatus 40. As shown in FIG. 2, the information processing apparatus 100 includes a processor 101, a main storage device 102, an auxiliary storage device 103, an input device 104, an output device 105, and a communication device 106. Some or all of functions of the information processing apparatus 100 may be implemented by using, for example, a virtual information processing resource such as a cloud server provided by a cloud system. In addition, the information processing apparatus 100 may be implemented by, for example, a plurality of physical or virtual (logical) information processing apparatuses which are cooperatively operated and communicably connected to one another. In addition, functions of at least two or more of the operation management apparatus 10, the service control apparatus 20, the external device control apparatus 30, and the area sensor information analyzing apparatus 40 may be implemented by a common information processing apparatus 100.

The processor 101 is configured by, for example, a central processing unit (CPU), a micro processing unit (MPU), a field-programmable gate array (FPGA), an application specific integrated circuit (ASIC), or the like. The main storage device 102 is a device which stores a program or data, and is constituted by, for example, a read only memory (ROM) (a static random access memory (SRAM), a non-volatile RAM (NVRAM), a mask ROM, a programmable ROM (PROM), or the like), a random access memory (RAM) (a dynamic RAM (DRAM) or the like), or the like.

The auxiliary storage device 103 is a hard disk drive, a flash memory, a solid state drive (SSD), an optical storage device (a compact disc (CD), a digital versatile disc (DVD), a Blu-ray (BD) (registered trademark) disc, or the like), or the like. A program or data stored in the auxiliary storage device 103 is frequently read by the main storage device 102.

The input device 104 is an interface for receiving an input of information from a user, and is, for example, a keyboard, a mouse, a card reader, a touch panel, or the like. The output device 105 is an interface for providing information to the user or the like, and is, for example, a display device (a liquid crystal display (LCD), a graphic card, or the like) which visualizes various kinds of information, a sound output device (speaker), a printing device, or the like. The communication device 106 is a communication interface for communicating with another apparatus through the communication network 5, and is, for example, a network interface card (NIC), a wireless communication module, or the like. In addition, for example, the information processing apparatus 100 may input or output information to or from another apparatus via the communication device 106.

Figure 3:
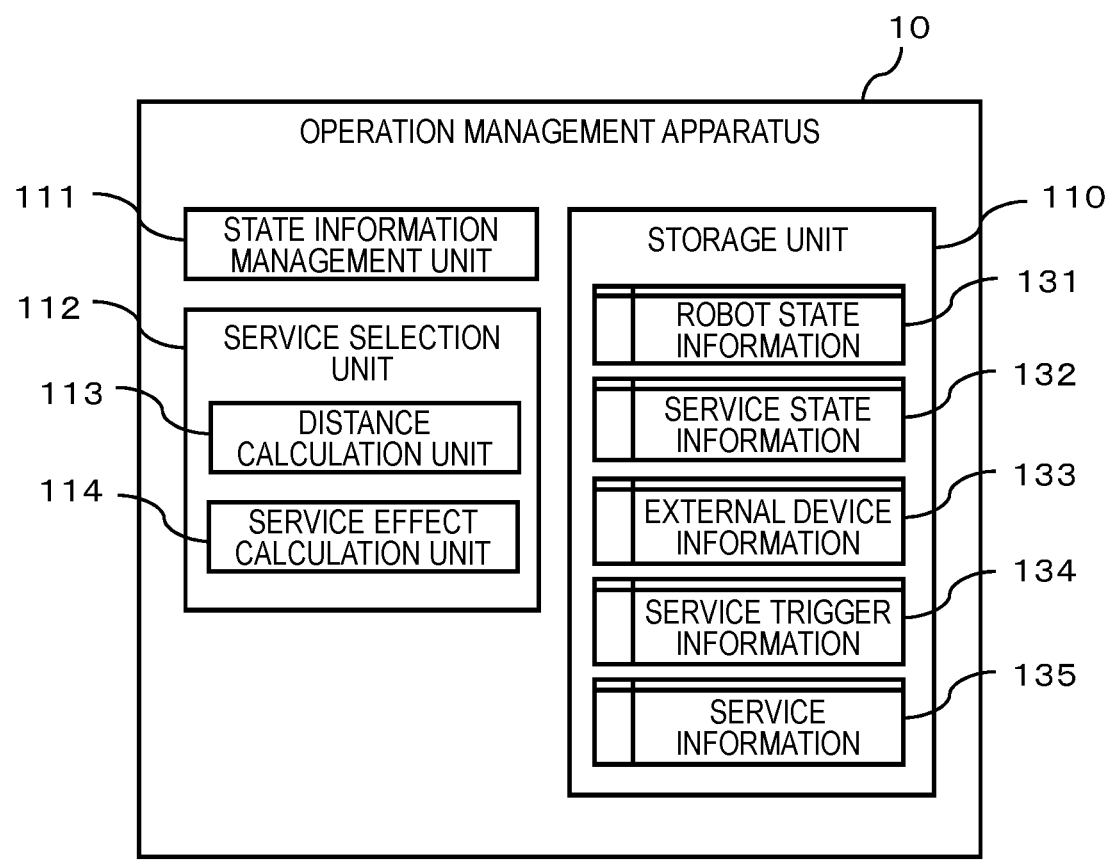
FIG. 3 is a diagram showing main functions of an operation management apparatus.

FIG. 3 shows main functions (software configuration) of the operation management apparatus 10. As shown in FIG. 3, the operation management apparatus 10 includes functions of a storage unit 110, a state information management unit 111, a service selection unit 112, a distance calculation unit 113, and a service effect calculation unit 114. For example, the processor 101 of the information processing apparatus 100 reads and executes a program stored in the main storage device 102 of the information processing apparatus 100, thereby implementing these functions. In addition, the operation management apparatus 10 may also include other functions such as an operating system, a file system, a device driver, a database management system (DBMS), and the like, in addition to the functions described above. The operation management apparatus 10 stores information (data) stored in the storage unit 110 as, for example, a table or a file of a database.

As shown in FIG. 3, the storage unit 110 stores robot state information 131, service state information 132, external device information 133, service trigger information 134, and service information 135.

Figure 4:
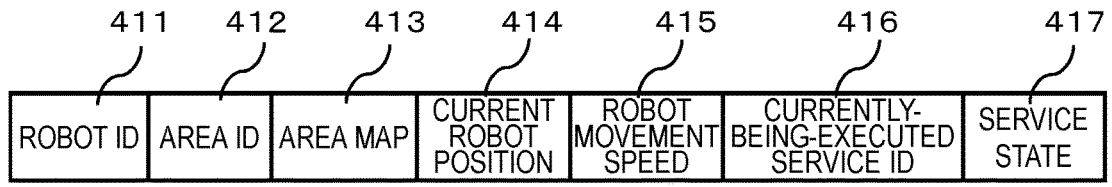
FIG. 4 is a diagram showing a data structure of robot state information.

FIG. 4 shows a data structure (record layout) of the robot state information 131. The robot state information 131 includes information on a state of each robot 70 present in the service providing area 2. The robot state information 131 includes one or more records with the data structure shown in FIG. 4. One record of the robot state information 131 corresponds to one robot 70.

As shown in FIG. 4, the robot state information 131 includes items including a robot ID 411, an area ID 412, an area map 413, a current robot position 414, a robot movement speed 415, a currently-being-executed service ID 416, and a service state 417.

An identifier (hereinafter, referred to as a robot ID) of the robot 70 is set as the robot ID 411. An identifier (hereinafter, referred to as an area ID) of the service providing area 2 in which the robot 70 (hereinafter, referred to as a corresponding robot 70) specified by the robot ID 411 is present is set as the area ID 412. Geographical information (position information, map information, information (a shape, a wideness, a sketch, or the like of the service providing area 2) on a physical structure of a base, or the like, hereinafter, referred to as an area map) of the service providing area 2 specified by the area ID 412, is set as the area map 413. Contents of the area map 413 are initially set when, for example, the robot 70 is introduced.

Information (hereinafter, referred to as a current robot position) indicating a current position of the robot 70 represented by a coordinate system (two-dimensional coordinate system or three-dimensional coordinate system) set in the service providing area 2 is set as the current robot position 414. A movement speed (for example, an average movement speed of the robot 70) of the robot 70 is set as the robot movement speed 145.

An identifier (hereinafter, referred to as a service ID) of a service (hereinafter, referred to as a currently-being-executed service) currently being executed by the corresponding robot 70 is set as the currently-being-executed service ID 416. Information (hereinafter, referred to as a service state)

indicating an execution state (execution stage) of the currently-being-executed service is set as the service state 417.

Figure 5:
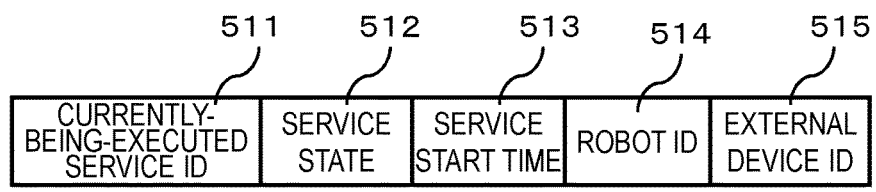
FIG. 5 is a diagram showing a data structure of service state information.

FIG. 5 shows a data structure of the service state information 132. The service state information 132 includes information on a currently-being-executed service. The service state information 132 includes one or more records with the data structure illustrated in FIG. 5. One record of the service state information 132 corresponds to one service executed by one robot 70.

As shown in FIG. 5, the service state information 132 includes items including a currently-being-executed service ID 511, a service state 512, a service start time 513, a robot ID 514, and an external device ID 515.

A service ID of a currently-being-executed service is set as the currently-being-executed service ID 511. A service state of the currently-being-executed service (hereinafter, referred to as a corresponding currently-being-executed service) specified by the currently-being-executed service ID 511 is set as the service state 512. A time (hereinafter, referred to as a service start time) when provision of the corresponding currently-being-executed service is started is set as the service start time 513. A robot ID of the robot 70 which is providing the corresponding currently-being-executed service is set as the robot ID 514. An external device ID of the external device 80 operated in connection with the provision of the corresponding currently-being-executed service is set as the external device ID 1516.

Figure 6:
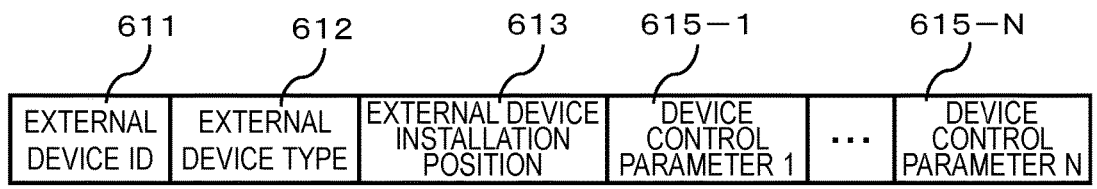
FIG. 6 is a diagram showing a data structure of external device information.

FIG. 6 shows a data structure of the external device information 133. The external device information 133 includes information on the external device 80. The external device information 133 includes one or more records with the data structure illustrated in FIG. 6. One record of the external device information 133 corresponds to one external device 80.

As shown in FIG. 6, the external device information 133 includes items including an external device ID 611, an external device type 612, an external device installation position 613, and device control parameters 1 to N (reference numerals 615-1 to 615-N).

An identifier (hereinafter, referred to as an external device ID) of the external device 80 is set as the external device ID 611. Information (hereinafter, referred to as an external device type) indicating a type of external device 80 (hereinafter, referred to as a corresponding external device 80) specified by the external device ID 611 is set as the external device type 612. Information (hereinafter, referred to as an external device installation position) indicating an installation position of the external device 80 in a coordinate system (which may be a two-dimensional coordinate system or a three-dimensional coordinate system) set in the service providing area 2 is set as the external device installation position 613.

A list (hereinafter, referred to as device control parameters 1 to N) of parameters which can be used to control the corresponding external device 80 is set as the device control parameters 1 to N (reference numerals 615-1 to 615-N). The device control parameters vary depending on the type of external device 80. For example, when the external device 80 is a digital signage, the device control parameter is, for example, a parameter which turns on/off a screen and specifies an identifier of contents to be displayed on the screen, and a place (page number, uniform resource locator (URL), or the like) to display the contents. In addition, for example, when the external device 80 is a camera, the device control parameter is, for example, a parameter which specifies an operation (panning and tilting) of the camera. In addition, for example, when the external device 80 is an elevator, the device control parameter is, for example, a parameter which specifies an operation or a stopping floor of the elevator.

Figure 7:
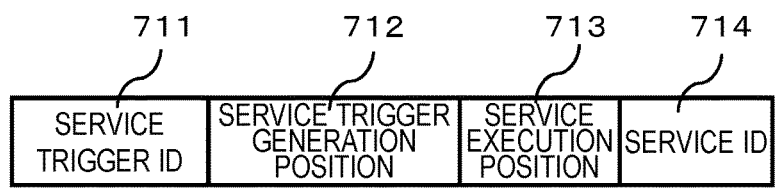
FIG. 7 is a diagram showing a data structure of service trigger information.

FIG. 7 shows a data structure of the service trigger information 134. The service trigger information 134 includes information (hereinafter, referred to as service trigger information) on a service trigger. The service trigger information 134 includes one or more records with the data structure illustrated in FIG. 7. One record of the service trigger information 134 corresponds to one service trigger.

As shown in FIG. 7, the service trigger information 134 includes items including a service trigger ID 711, a service trigger generation position 712, a service execution position 713, and a service ID 714.

An identifier (hereinafter, referred to as a service trigger ID) of the service trigger is set as the service trigger ID 711. Information (for example, information (a robot ID, an external device ID, an identifier (an area sensor ID to be described later) of the area sensor 90, or the like, hereinafter, referred to as a service trigger generation position) which specifies a transmission source of analysis information) indicating a position at which the service trigger (hereinafter, referred to as a corresponding service trigger) specified by the service trigger ID 711 is generated is set as the service trigger generation position 712. Information indicating a position (hereinafter, referred to as a service execution position) at which a service corresponding to the corresponding service trigger is executed is set as the service execution position 713. A service ID of the service corresponding to the corresponding service trigger is set as the service ID 714. Further, the service trigger generation position or the service execution position may also be, for example, information represented by a coordinate system (which may be a two-dimensional coordinate system or a three-dimensional coordinate system) set in the service providing area 2.

Figure 8:
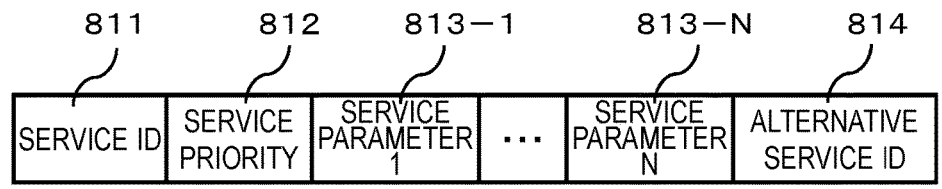
FIG. 8 is a diagram showing a data structure of service information.

FIG. 8 shows a data structure of the service information 135. The service information 135 includes information on a service which can be executed by the robot 70. The service information 135 includes one or more records with the data structure illustrated in FIG. 8. One record of the service information 135 corresponds to one service.

As shown in FIG. 8, the service information 135 includes items including a service ID 811, a service priority 812, service parameters 1 to N (reference numerals 813-1 to 813-N), and an alternative service ID 814.

A service ID is set as the service ID 811. Information (hereinafter, referred to as a service priority), which is used to calculate an index (hereinafter, referred to as a service effect) indicating an effect of the service (hereinafter, referred to as a corresponding service) specified by the service ID 811, and indicates an execution priority of the corresponding service is set as the service priority 812.

Parameters (hereinafter, referred to as service parameters) used to calculate the effect of the service are set as the service parameters 1 to N (reference numerals 813-1 to 813-N). An identifier (hereinafter, referred to as an alternative service ID) which specifies a service (hereinafter, referred to as an alternative service) which is an alternative for the corresponding service is set as the alternative service ID 814. Here, the alternative service is a service executed as an alternative for a currently-being-executed service in order to execute another service when a service trigger of another service with a higher service priority than a service priority of the currently-being-executed service is generated. For example, in a case where the service is a "service of showing the way while moving together with people", an alternative service of "providing a guide map to people without moving" can be considered.

Figure 9:
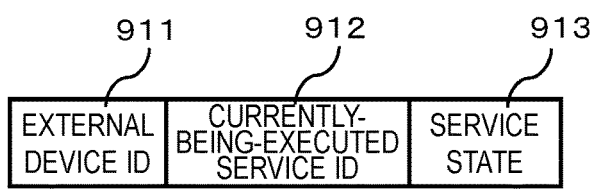
FIG. 9 is a diagram showing a data structure of external device state information.

FIG. 9 shows a data structure of the external device state information 136. The external device state information 136 includes information on a state of the external device 80. The external device state information 136 includes one or more records with the data structure illustrated in FIG. 9. One record of the external device state information 136 corresponds to one external device 80.

As shown in FIG. 9, the external device state information 136 includes items including an external device ID 911, a currently-being-executed service ID 912, and a service state 913.

An external device ID is set as the external device ID 911. A service ID of a service currently being executed by the external device 80 (hereinafter, referred to as a corresponding external device 80) specified by the external device ID 911 is set as the currently-being-executed service ID 912. A service state of the service currently being executed by the external device 80 is set as the service state 913.

Figure 10:
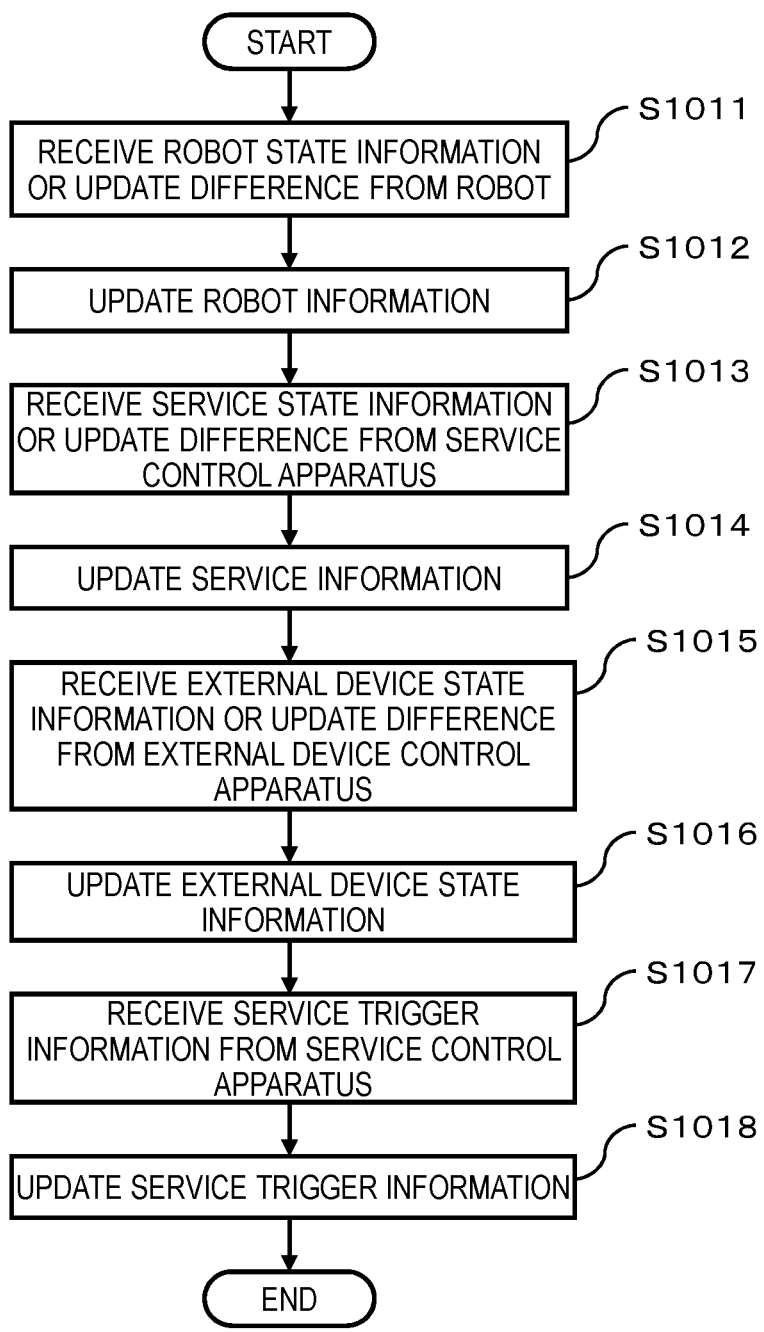
FIG. 10 is a flowchart for describing a state information update processing.

Returning to FIG. 3, the state information management unit 111 performs a state information update processing S1000 shown in FIG. 10. The service selection unit 112 performs a service selection processing S1100 shown in FIG. 11. The distance calculation unit 113 performs a distance calculation processing S1112 shown in FIG. 12. Further, the service effect calculation unit 114 performs a service effect calculation processing S1114 shown in FIG. 13.

FIG. 10 is a flowchart for describing the state information update processing S1000 performed by the state information management unit 111. Hereinafter, the state information update processing S1000 will be described with reference to FIG. 10. The state information management unit 111 performs the state information update processing S1000, for example, at each preset timing (for example, periodically (every several minutes, every several seconds, or the like)).

First, the state information management unit 111 receives robot state information 751 to be described later or an update difference of the robot state information 751 from the robot 70 (S1011), and updates the robot state information 131 based on the received robot state information 751 or the update difference (S1012).

Then, the state information management unit 111 receives service state information 232 to be described later or an update difference of the service state information 232 from the service control apparatus 20 (S1013), and updates the service state information 132 based on the received service state information 232 or the update difference (S1014).

Then, the state information management unit 111 receives external device state information 852 to be described later or an update difference of the external device state information 852 from the external device control apparatus 30 (S1015), and updates the external device state information 136 based on the received external device state information 852 or the update difference (S1016).

Then, the state information management unit 111 receives service trigger information from the service control apparatus 20 (S1017), and updates the service trigger information 134 based on the received service trigger information (S1018).

Figure 11:
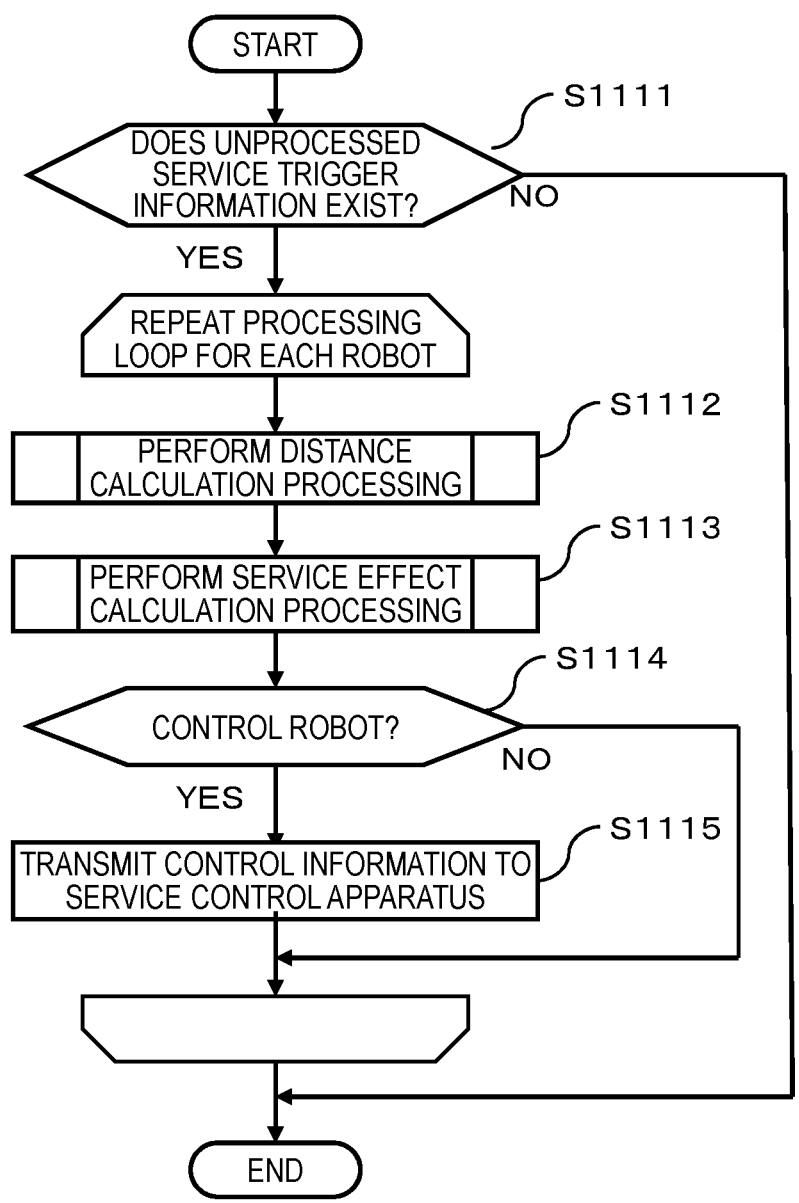
FIG. 11 is a flowchart for describing a service selection processing.

FIG. 11 is a flowchart for describing the service selection processing S1100 performed by the service selection unit 112. Hereinafter, the service selection processing S1100 will be described with reference to FIG. 11. The service selection unit 112 performs the service selection processing S1100, for example, at each preset timing (for example, periodically or the like) or when the state information update processing S1000 is performed.

First, the service selection unit 112 determines whether or not unprocessed service trigger information 134 exists (S1111). When no unprocessed service trigger information 134 exists (NO in S1111), the service selection processing S1100 ends.

Meanwhile, when the unprocessed service trigger information exists (YES in S1111), the service selection unit 112 starts a processing of determining whether or not to execute a service corresponding to a service trigger for each robot 70.

First, the service selection unit 112 performs the distance calculation processing S1112, and then performs a service effect calculation processing S1113. Details of the distance calculation processing S1112 and the service effect calculation processing S1113 will be described later.

Next, the service selection unit 112 determines whether or not to control the robot 70 based on a result of the service effect calculation processing S1013 (S1114). The service selection unit 112 determines to control the robot 70, for example, in a case where a service trigger which corresponds to a service having a service effect greater than a service effect of a currently-being-executed service exists as a result of performing the service effect calculation processing S1113. When it is determined to control the robot 70 (YES in S1114), the service selection unit 112 transmits, to the service control apparatus 20, control information for causing the robot 70 to execute a service (or an alternative service) corresponding to a service trigger selected in S1316 in FIG. 13 to be described later. When it is determined not to control the robot 70 (NO in S1114), the service selection unit 112 repeats the processing loop for the next robot 70 or ends the service selection processing S1100 (when the processing loop is executed for all robots 70).

Figure 12:
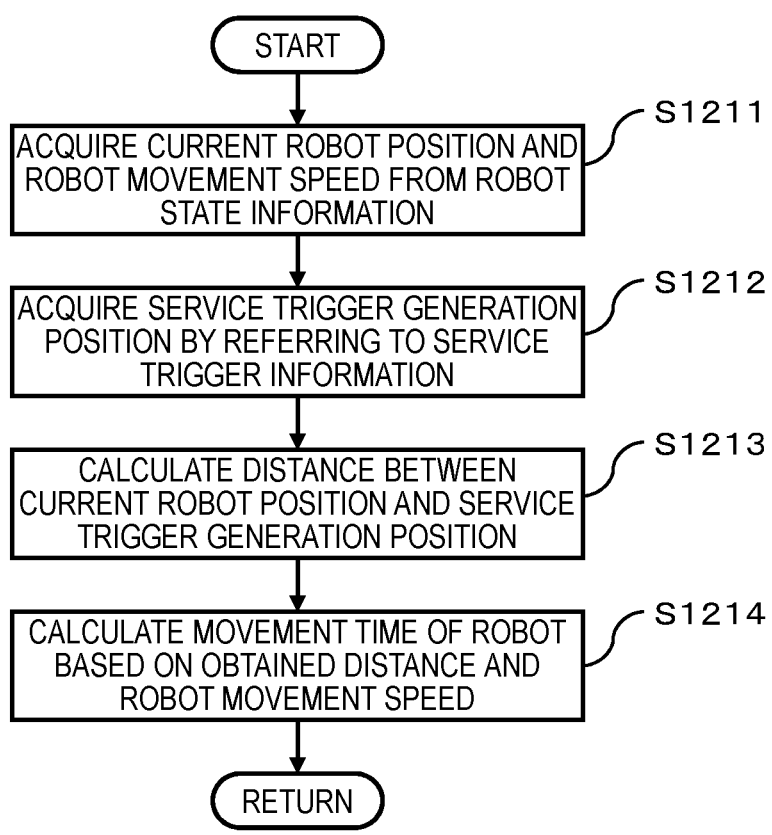
FIG. 12 is a flowchart for describing a distance calculation processing.

FIG. 12 is a flowchart for describing the distance calculation processing S1112 in FIG. 11 performed by the distance calculation unit 113. Hereinafter, the distance calculation processing S1112 will be described with reference to FIG. 12.

The distance calculation unit 113 first acquires a current robot position and a robot movement speed by referring to the robot state information 131 (S1211).

Then, the distance calculation unit 113 acquires a service trigger generation position by referring to the service trigger information 134 (S1212).

Then, the distance calculation unit 113 calculates a distance from the current position of the robot 70 to the service trigger generation position (a position at which the robot 70 provides a service) based on the current robot position and the service trigger generation position (S1213).

Then, the distance calculation unit 113 calculates a time (movement time) required for the robot 70 to move from the current position to the service trigger generation position based on the distance calculated in S1213 and the movement speed of the robot 70 acquired from the robot state information 131 (S1214).

Figure 13:
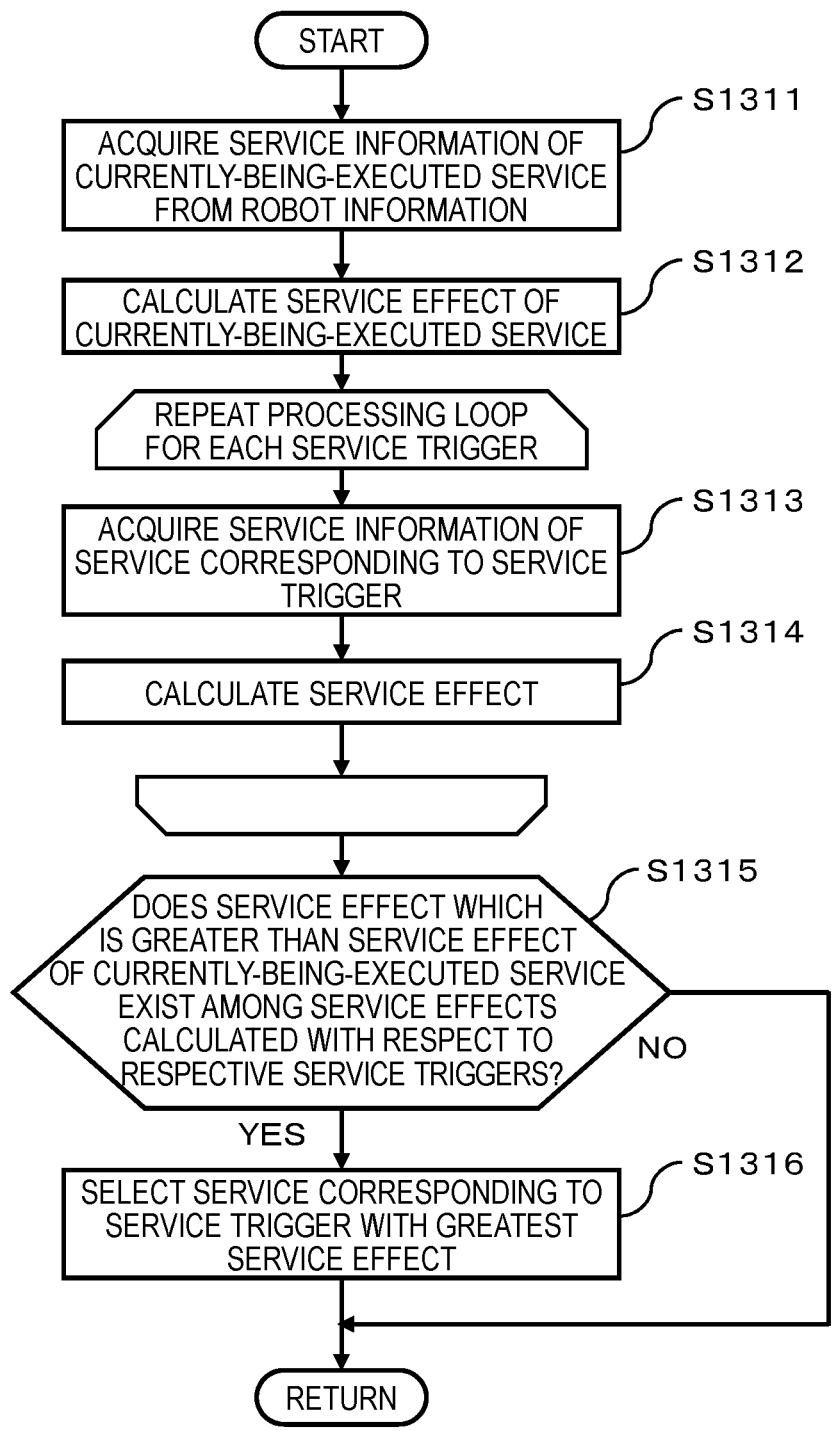
FIG. 13 is a flowchart for describing a service effect calculation processing.

FIG. 13 is a flowchart for describing the service effect calculation processing S1113 in FIG. 11 performed by the service effect calculation unit 114. Hereinafter, the service effect calculation processing S1113 will be described with reference to FIG. 13.

The service effect calculation unit 114 first acquires information on a currently-being-executed service of the robot 70 which is currently selected from the service state information 132 and the service information 135 (S1311), and then calculates a service effect of the currently-being-executed service (S1312).

Next, the service effect calculation unit 114 specifies a service (service ID 811) corresponding to a service trigger (service trigger ID 815) by referring to the service information 135 for each service trigger, and calculates a service effect based on a movement time of the robot 70 and service information of the service executed with the service trigger (S1313 and S1314).

Here, the service effect is calculated by using, for example, the following Equation.

$$\text{Service effect} = (t1/(t0+t1)) \times \alpha 0 \times \alpha 1 \times \alpha 2$$

In the above Equation, t0 represents a movement time required for the robot 70 to move to a service execution position, and t1 represents a time (an average time required for a service, or the like) required for a service executed by the robot 70. α0, α1, and α2 represent service parameters. For example, α0, α1, and α2 are values determined based on information (for example, information received through the state information update processing S1000 or information stored in the storage unit 110) acquired in the service providing area 2, and for example, are values determined based on a service priority, whether or not a service is currently being executed, whether or not an alternative service for the currently-being-executed service exists, and the like. The above Equation is only an example, and the type or number of service parameters is not necessarily limited.

Once the processing loop (S1313 and S1314) for each service trigger ends, the service effect calculation unit 114 compares service effects of respective services corresponding to respective service triggers with the service effect of the currently-being-executed service of the robot 70 which is currently selected, and determines whether or not a service effect greater than the service effect of the currently-being-executed service exists among the service effects calculated with respect to the respective service triggers (S1315).

When no service effect greater than the service effect of the currently-being-executed service exists among the service effects calculated with respect to the respective service triggers (NO in S1315), the service effect calculation unit 114 ends the service effect calculation processing S1113. Then, the processing proceeds to S1114 in FIG. 11.

On the other hand, when a service effect greater than the service effect of the currently-being-executed service exists among the service effects calculated with respect to the respective service triggers (YES in S1315), the service effect calculation unit 114 selects a service trigger (or a service corresponding to the corresponding service trigger) with the greatest service effect, and then ends the service effect calculation processing S1113. Then, the processing proceeds to S1114 in FIG. 11.

Figure 14:
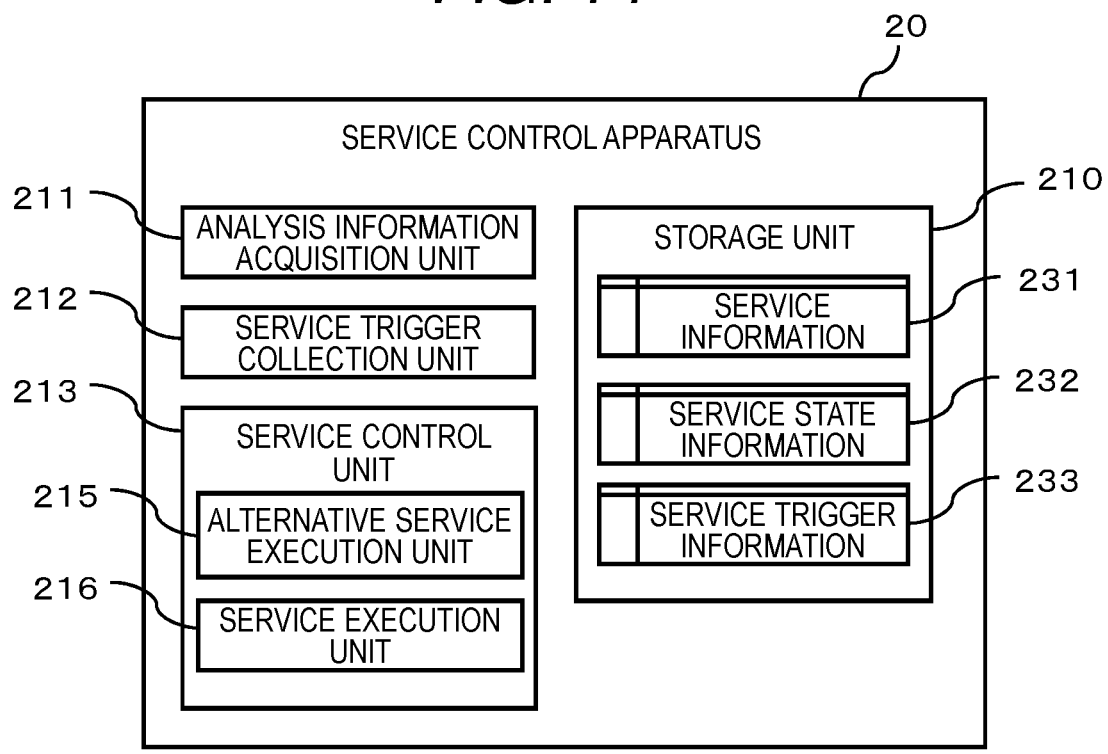
FIG. 14 is a diagram showing main functions of a service control apparatus.

FIG. 14 shows main functions (software configuration) of the service control apparatus 20. As illustrated in FIG. 14, the service control apparatus 20 includes functions of a storage unit 210, an analysis information acquisition unit 211, a service trigger collection unit 212, a service control unit 213, an alternative service execution unit 215, and a service execution unit 216. For example, the processor 101 of the information processing apparatus 100 reads and executes a program stored in the main storage device 102 of the information processing apparatus 100, thereby implementing these functions. In addition, the service control apparatus 20 may also include other functions such as an operating system, a file system, a device driver, a DBMS, or the like, in addition to the functions described above. The service control apparatus 20 stores information (data) stored in the storage unit 210 as, for example, a table or a file of a database.

As illustrated in FIG. 14, the storage unit 210 stores service information 231, service state information 232, and service trigger information 233.

Figure 15:
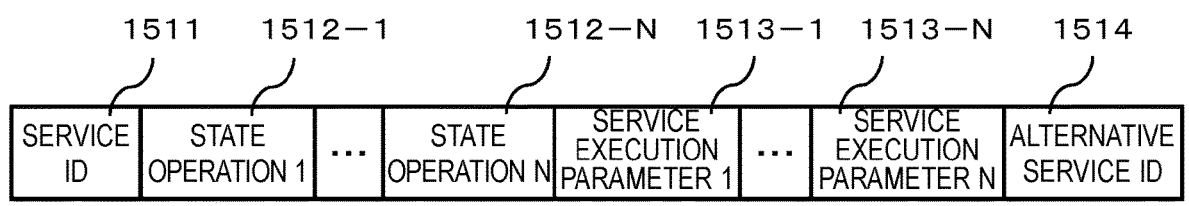
FIG. 15 is a diagram showing a data structure of service information.

FIG. 15 shows a data structure of the service information 231. The service information 231 includes information on a service executed by the robot 70. As shown in FIG. 15, the service information 231 includes items including a service ID 1511, state operations 1 to N (reference numerals 1512-1 to 1512-N), service execution parameters 1 to N (reference numerals 1513-1 to 1513-N), and an alternative service ID 1514. The service information 231 includes one or more records with the data structure illustrated in FIG. 15. One record of the service information 231 corresponds to one service.

The service ID described above is set as the service ID 1511. Information (hereinafter, referred to as a state operation) indicating an operation for each state of a service (hereinafter, referred to as a corresponding service) specified by the service ID 1511 is set as the state operations 1 to N (reference numerals 1512-1 to 1512-N). Parameters when the corresponding service is executed are set as the service execution parameters 1 to N (reference numerals 1513-1 to 1513-N). An alternative service ID of an alternative service for the corresponding service is set as the alternative service ID 1514.

Figure 16:
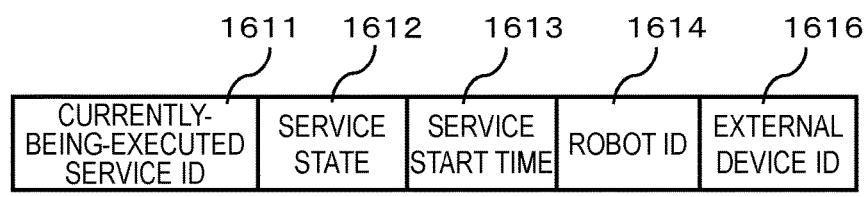
FIG. 16 is a diagram showing a data structure of service state information.

FIG. 16 shows a data structure of the service state information 232. The service state information 232 includes information on a service currently being executed by the robot 70. The service state information 232 includes one or more records with the data structure illustrated in FIG. 16. One record of the service state information 232 corresponds to one service executed by one robot 70.

As shown in FIG. 16, the service state information 232 has items including a currently-being-executed service ID 1611, a service state 1612, a service start time 1613, a robot ID 1614, and an external device ID 1616.

A service ID of a currently-being-executed service is set as the currently-being-executed service ID 1611. A current service state of the service (hereinafter, referred to as a corresponding currently-being-executed service) specified by the currently-being-executed service ID 1611 is set as the service state 1612. A service start time of the corresponding currently-being-executed service is set as the service start time 1613. A robot ID of the robot 70 which is currently executing the corresponding currently-being-executed service is set as the robot ID 1614. An external device ID of the external device 80 which is operated in connection with the provision of the corresponding currently-being-executed service is set as the external device ID 1616.

Figure 17:
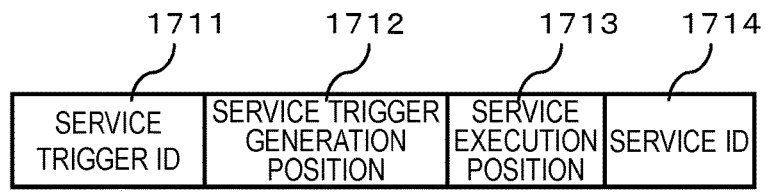
FIG. 17 is a diagram showing a data structure of service trigger information.

FIG. 17 shows a data structure of the service trigger information 233. The service trigger information 233 includes information on a service trigger generated by the service trigger collection unit 212. The service trigger information 233 includes one or more records with the data structure illustrated in FIG. 17. One record of the service trigger information 233 corresponds to one service trigger. Details of the service trigger information 233 will be described later.

Returning to FIG. 14, the analysis information acquisition unit 211 acquires the analysis information described above. The service trigger collection unit 212 performs a service trigger collection processing S1800 in FIG. 18. The service control unit 213 performs a service control processing S1900 in FIG. 19. The alternative service execution unit 215 performs an alternative service execution processing S1913 in FIG. 20. The service execution unit 216 performs a service execution processing S1914 in FIG. 21.

Figure 18:
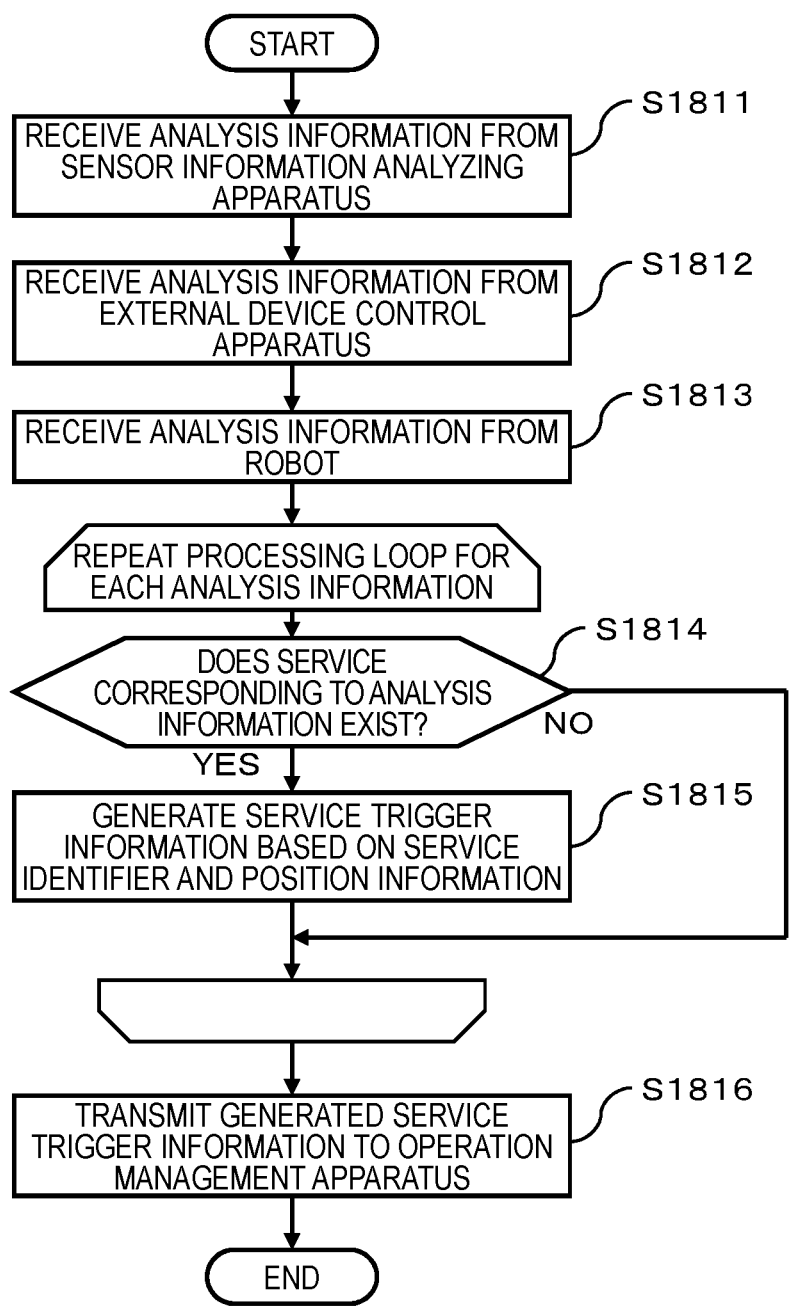
FIG. 18 is a flowchart for describing a service trigger collection processing.

FIG. 18 is a flowchart for describing the service trigger collection processing S1800 performed by the service trigger collection unit 212. Hereinafter, the service trigger collection processing S1800 will be described with reference to FIG. 18. The service trigger collection unit 212 performs the service trigger collection processing S1800, for example, periodically, or when receiving analysis information from at least one of the area sensor information analyzing apparatus 40, the external device control apparatus 30, and the robot 70.

First, the service trigger collection unit 212 receives analysis information from the area sensor information analyzing apparatus 40 (S1811), receives analysis information to be described later from the external device control apparatus 30 (S1812), and receives analysis information to be described later from the robot 70 (S1813).

Here, the analysis information received by the service trigger collection unit 212 from the area sensor information analyzing apparatus 40 or the robot 70 includes, for example, information such as information (a person stands in front of the robot 70, the external device 80, or the area sensor 90, a person initiates a conversation with the robot 70, or a person presses a switch of the robot 70 or the external device 80) on any motion of a person, information on a position of a person (a position of a person specified by analyzing information acquired from the area sensor 90 (a temperature sensor, a humidity sensor, a distance measuring sensor, a position sensor, or the like)), or the like. In addition, the analysis information received by the service trigger collection unit 212 from the external device control apparatus 30 includes information output from the external device 80 such as information on a flow of people photographed by a camera as the external device 80 or failure information of an air-conditioner.

Next, the service trigger collection unit 212 determines whether or not a service corresponding to analysis information exists for each piece of analysis information acquired in S1811 to S1813 by referring to the service information 231 (S1814 and S1815). For example, in a case where analysis information includes information indicating a current position of a person, and the current position is a place near an entrance of an event hall, a service such as reception of guests or greeting corresponds to the analysis information. In addition, for example, in a case where analysis information includes information indicating that a person presses a button for requesting an inquiry, a service such as demanding a person's business corresponds to the analysis information. In addition, for example, in a case where analysis information includes information indicating that a temperature is measured, a service such as a daily conversation about the temperature corresponds to the analysis information.

When the service trigger collection unit 212 determines that no service corresponding to the analysis information exists (NO in S1814), the processing in S1815 is skipped.

On the other hand, when it is determined that a service corresponding to the analysis information exists (YES in S1814), the service trigger collection unit 212 generates the service trigger information 233 shown in FIG. 17 (S1815).

As shown in FIG. 17, the service trigger information 233 includes items including a service trigger ID 1711, a service trigger generation position 1712, a service execution position 1713, and a service ID 1714.

A service trigger ID is set as the service trigger ID 1711. Information (for example, information (a robot ID, an external device ID, an identifier (an area sensor ID to be described later) of the area sensor 90, or the like) which specifies a transmission source of analysis information) indicating a position at which the service trigger is generated is set as the service trigger generation position 1712. Information indicating a position (hereinafter, referred to as a service execution position) at which a service corresponding to the service trigger (hereinafter, referred to as a corresponding service trigger) specified by the service trigger ID 1711 is executed is set as the service execution position 1713. A service ID of the service corresponding to the corresponding service trigger is set as the service ID 1714.

Returning to FIG. 18, the service trigger collection unit 212 transmits the service trigger information 233 generated in S1815 to the operation management apparatus 10 in S1816. The operation management apparatus 10 stores the service trigger information 233 received from the service control apparatus 20 as the service trigger information 134 shown in FIG. 7.

Figure 19:
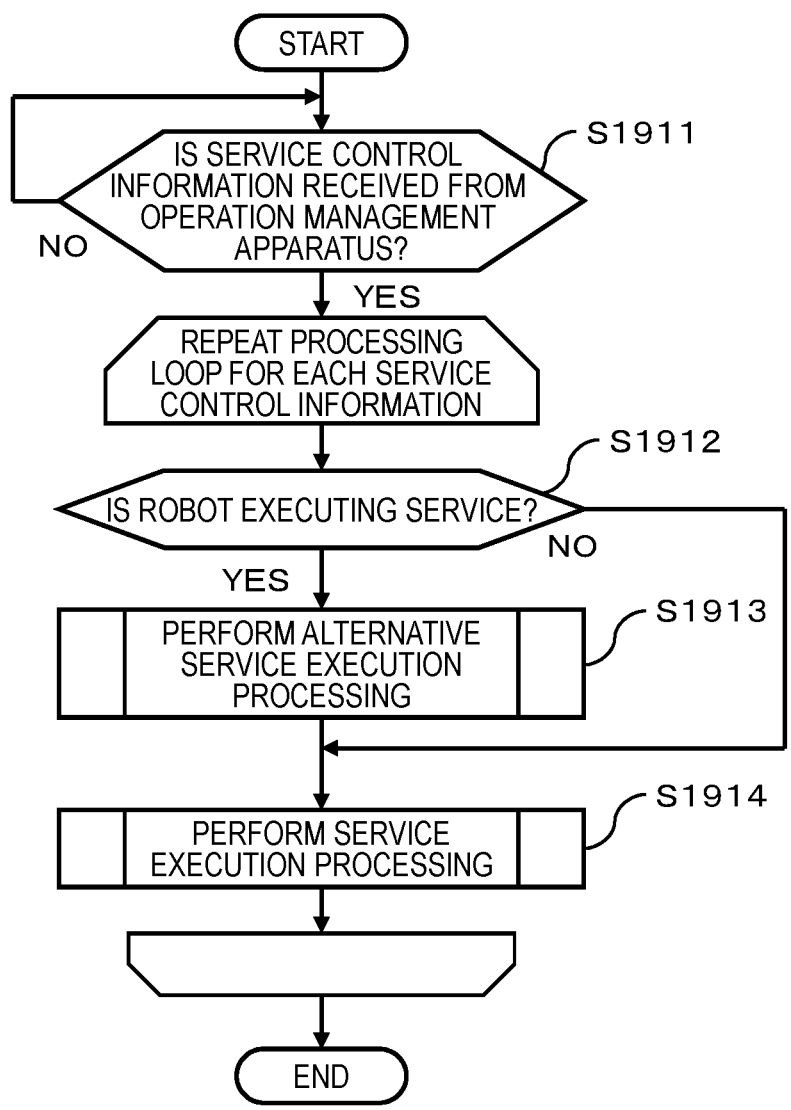
FIG. 19 is a flowchart for describing a service control processing.

FIG. 19 is a flowchart for describing the service control processing S1900 performed by the service control unit 213. Hereinafter, the service control processing S1900 will be described with reference to FIG. 19.

The service control unit 213 monitors whether or not service control information is received from the operation management apparatus 10 in real time (NO in S1911). When the service control unit 213 determines that the service control information is received (YES in S1911), the processing proceeds to S1912.

The service control unit 213 determines whether or not the robot 70 specified in the service control information as a service execution subject is currently executing any service (whether or not a currently-being-executed service exists). In addition, the processings in S1912 to S1914 are repeatedly performed for each piece of service trigger information.

Figure 20:
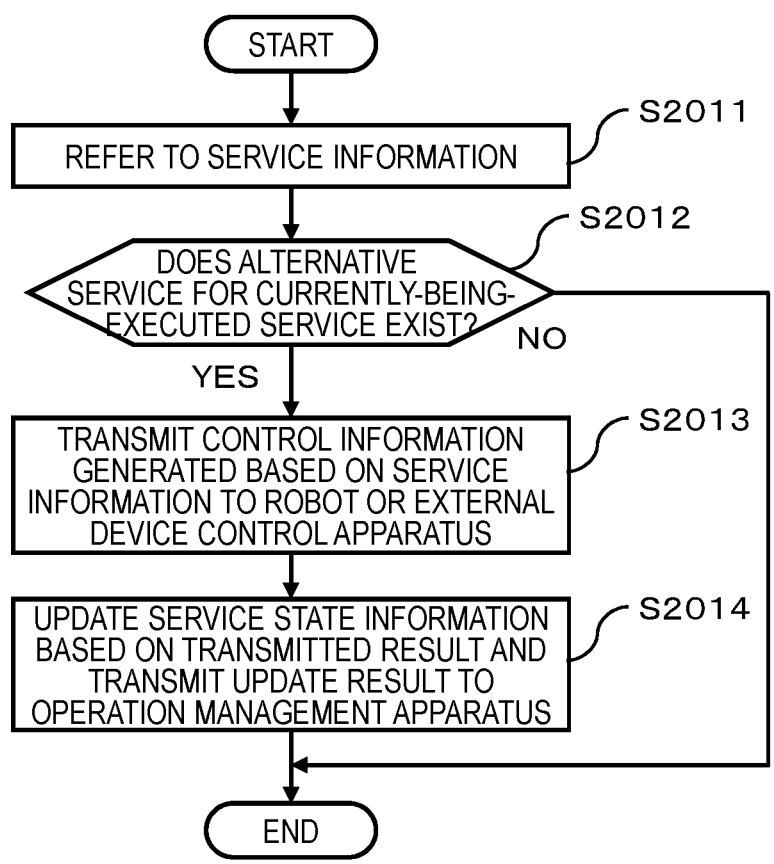
FIG. 20 is a flowchart for describing an alternative service execution processing.
Figure 21:
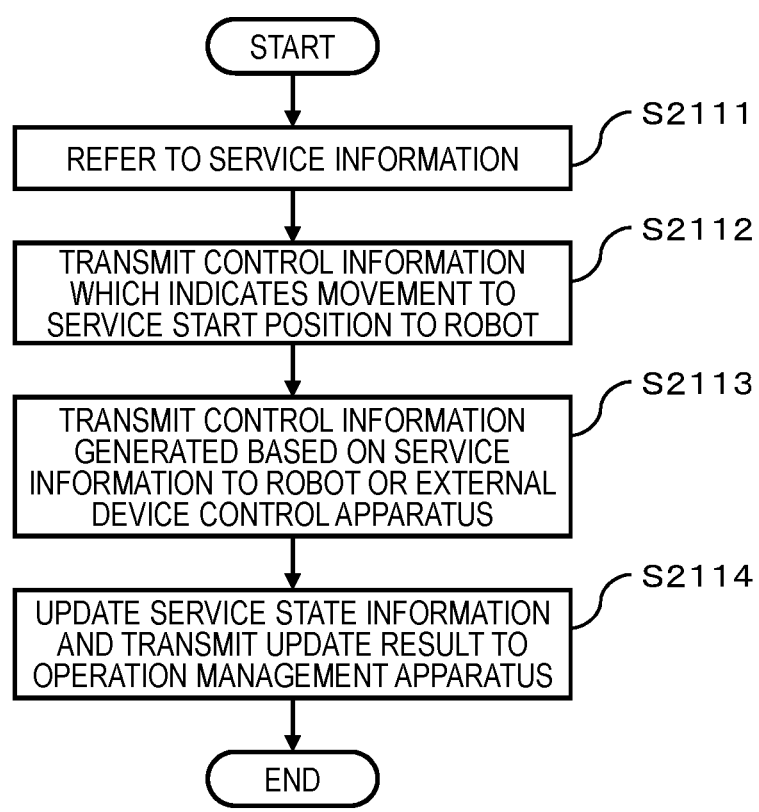
FIG. 21 is a flowchart for describing a service execution processing.

When the robot 70 as the service execution subject is currently executing any service (YES in S1912), the service control unit 213 performs the alternative service execution processing S1913 in FIG. 20 by operating the alternative service execution unit 215, and then performs the service execution processing S1914 in FIG. 21 by operating the service execution unit 216.

On the other hand, when the robot 70 as the service execution subject is not currently executing any service (NO in S1912), the processing in S1913 is skipped, and the service control unit 213 performs the service execution processing S1914 in FIG. 21 by operating the service execution unit 216.

FIG. 20 is a flowchart for describing the alternative service execution processing S1913 performed by the alternative service execution unit 215. Hereinafter, the alternative service execution processing S1913 will be described with reference to FIG. 20.

First, the alternative service execution unit 215 determines whether or not an alternative service for the currently-being-executed service exists (S2012) by referring to the service information 231 (S2011). When no alternative service for the currently-being-executed service exists (NO in S2012), the alternative service execution processing S1913 ends.

On the other hand, when the alternative service for the currently-being-executed service exists (YES in S2012), the alternative service execution unit 215 transmits control information of an alternative service generated based on the service information 231 to the robot 70 or the external device control apparatus 30 (S2013), and updates the service state information 232 based on the transmitted control information and transmits an update result (service state information 232 after update, or an update difference) to the operation management apparatus 10 (S2014).

FIG. 21 is a flowchart for describing the service execution processing S1914 performed by the service execution unit 216. Hereinafter, the service execution processing S1914 will be described with reference to FIG. 21.

First, the service execution unit 216 transmits, to the robot 70, control information which indicates movement to a service start position (S2112) by referring to the service information 231 (S2111).

Next, the service execution unit 216 transmits control information generated based on the service information 231 to the robot 70 or the external device control apparatus 30 (S2113), and updates the service state information 232 based on the transmitted control information and transmits an update result (service state information 232 after update, or an update difference) to the operation management apparatus 10 (S2114).

Hereinabove, the operation management apparatus 10 and the service control apparatus 20 have been described. As described above, the operation management apparatus 10 calculates a service effect of a service corresponding to each of a plurality of generated service triggers, selects a service depending on the service effects calculated with respect to the service triggers, and causes the robot 70 to execute the selected service. Therefore, it is possible to cause the robot 70 to execute an appropriate service when a plurality of service triggers are generated. In addition, the operation management apparatus 10 selects a service corresponding to a service trigger with the calculated greatest service effect among the service triggers and causes the robot 70 to execute the selected service, such that it is possible to cause the robot 70 to execute a service with a great service effect when a plurality of service triggers are generated.

Further, the operation management apparatus 10 calculates a service effect based on a movement time of the robot 70 calculated based on a distance between a current robot position and a service trigger generation position, a service priority of a service corresponding to a service trigger, and the like, such that it is possible to flexibly and appropriately select a service to be executed by the robot 70 depending on a user's need or the like.

In addition, the service control apparatus 20 collects a service trigger based on information obtained by analyzing robot sensor information transmitted from the robot 70, information obtained by analyzing information on a state of the external device 80 or the like transmitted from the external device control apparatus 30, and analysis information which is information transmitted from the area sensor information analyzing apparatus 40, such that it is possible to finely deal with various service triggers generated in the service providing area 2.

Further, in causing the robot 70 to execute a service corresponding to a selected service trigger, when the corresponding robot 70 is currently executing another service, the service control apparatus 20 causes the robot or the external device 80 to execute an alternative service. As a result, it is possible to provide a service corresponding to a service trigger and continue to provide a service for supporting a currently-being-executed service.

In addition, in causing the robot 70 to execute a service corresponding to a selected service trigger, in a case where the corresponding robot 70 is currently executing another service, the service control apparatus 20 may stop provision of the corresponding another service and start to provide the service corresponding to the service trigger. As a result, it is possible to rapidly provide the service corresponding to the service trigger. Further, for example, the service control apparatus 20 may increase a service provision (execution) speed or omit a part of a service to decrease an execution time of a currently-being-executed service. As a result, it is possible to rapidly provide the service corresponding to the service trigger without stopping the currently-being-executed service.

In addition, in causing the robot 70 to execute a service corresponding to a selected service trigger, in a case where the corresponding robot 70 is currently executing another service, the service control apparatus 20 may determine an influence caused by stopping the currently-being-executed service and continue the execution of the currently-being-executed service when the influence exceeds a preset threshold value. Further, whether to continue the currently-being-executed service or execute an alternative service may be selected depending on the influence.

In addition, in causing the robot 70 to execute a service corresponding to a selected service trigger, in a case where the corresponding robot 70 is currently executing another service, the service control apparatus 20 may continue to cause the robot 70 to execute the currently-being-executed service when a service priority of the service corresponding to the selected service trigger is lower than a service priority of the currently-being-executed service.

Figure 22:
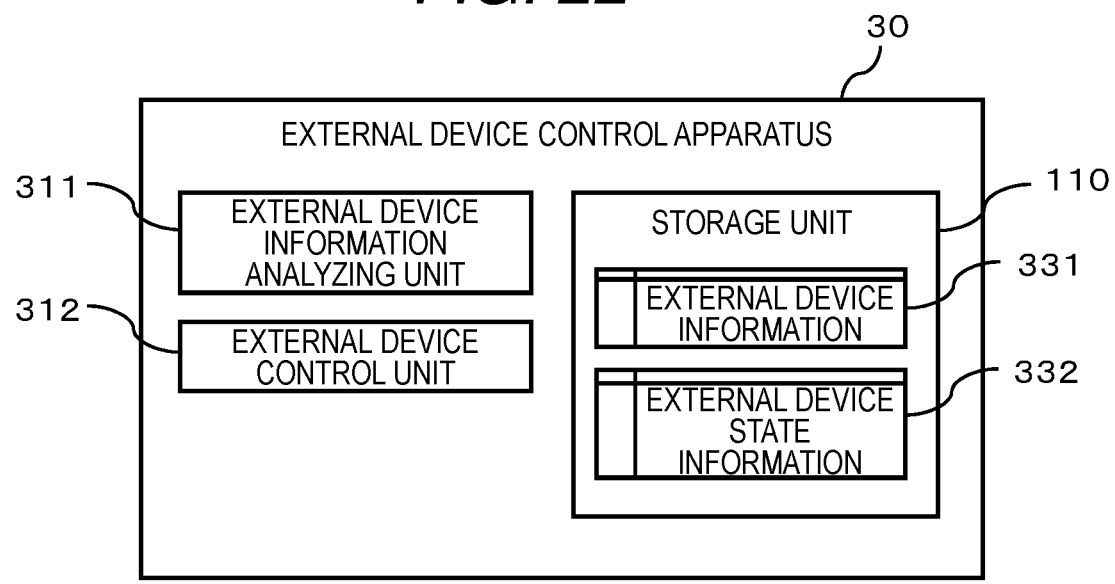
FIG. 22 is a diagram showing main functions of an external device control apparatus.

FIG. 22 shows main functions (software configuration) of the external device control apparatus 30. As shown in FIG. 22, the external device control apparatus 30 includes functions of a storage unit 310, an external device information analyzing unit 311, and an external device control unit 312. For example, the processor 101 of the information processing apparatus 100 reads and executes a program stored in the main storage device 102 of the information processing apparatus 100, thereby implementing these functions. In addition, the external device control apparatus 30 may also include other functions such as an operating system, a file system, a device driver, a DBMS, or the like, in addition to the functions described above. The external device control apparatus 30 stores information (data) stored in the storage unit 310 as, for example, a table or a file of a database.

As illustrated in FIG. 22, the storage unit 310 stores external device information 331 and external device state information 332.

Figure 23:
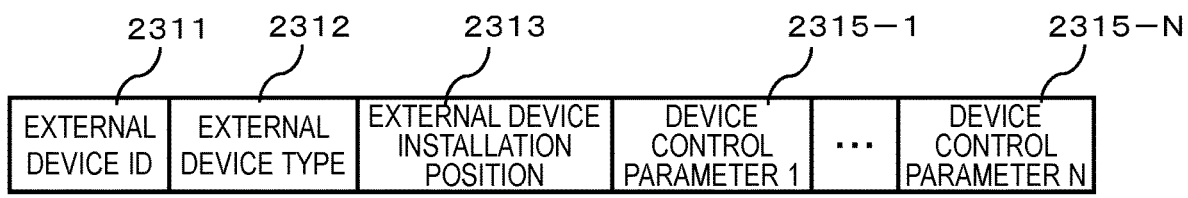
FIG. 23 is a diagram showing a data structure of external device information.

FIG. 23 shows a data structure of the external device information 331. The external device information 331 includes information on the external device 80 which can be used by the robot 70. As shown in FIG. 23, the external device information 331 includes items including an external device ID 2311, an external device type 2312, an external device installation position 2313, and device control parameters 1 to N (reference numerals 2315-1 to 2315-N). The external device information 331 includes one or more records with the data structure illustrated in FIG. 23. One record of the external device information 331 corresponds to one external device 80.

The external device ID described above is set as the external device ID 2311. The external device type described above is set as the external device type 2312. The external device installation position described above is set as the external device installation position 2313. The device control parameters 1 to N described above are set as the device control parameters 1 to N (reference numerals 2315-1 to 2315-N).

Figure 24:
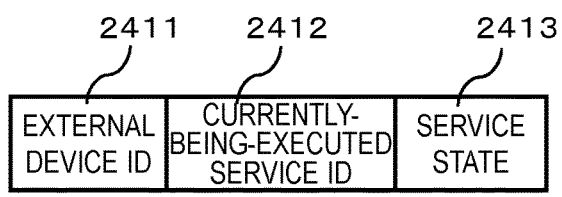
FIG. 24 is a diagram showing a data structure of external device state information.

FIG. 24 shows a data structure of the external device state information 332. The external device state information 332 includes information on a state of the external device 80. The external device state information 332 includes one or more records with the data structure illustrated in FIG. 24. One record of the external device state information 332 corresponds to one external device 80.

As shown in FIG. 24, the external device state information 136 includes items including an external device ID 2411, a currently-being-executed service ID 2412, and a service state 2413.

The external device ID described above is set as the external device ID 2411. A service ID of a service which is currently being executed by the external device 80 (hereinafter, referred to as a corresponding external device 80) specified by the external device ID 2411 is set as the currently-being-executed service ID 2412. A service state of the currently-being-executed service is set as the service state 2413.

Figure 25:
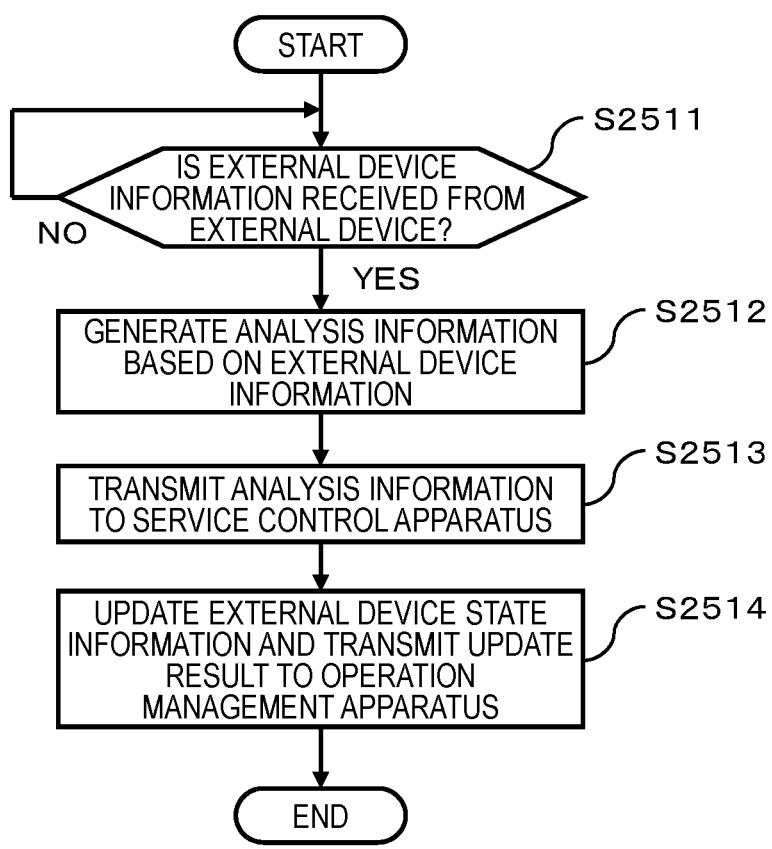
FIG. 25 is a flowchart for describing an external device information analyzing processing.

Returning to FIG. 22, the external device information analyzing unit 311 performs an external device information analyzing processing S2500 shown in FIG. 25. The external device control unit 312 performs an external device control processing S2600 in FIG. 26.

FIG. 25 is a flowchart for describing the external device information analyzing processing S2500 performed by the external device information analyzing unit 311. Hereinafter, the external device information analyzing processing S2500 will be described with reference to FIG. 25. The external device information analyzing unit 311 performs the external device information analyzing processing S2500 when, for example, receiving the external device information from the external device 80.

First, the external device information analyzing unit 311 monitors whether or not external device information is received from the external device 80 in real time (NO in S2511). When the external device information analyzing unit 311 determines that the external device information is received from the external device 80 (YES in S2511), the processing proceeds to S2512.

In S2512, the external device information analyzing unit 311 generates analysis information by analyzing the received external device information.

Then, the external device information analyzing unit 311 transmits the generated analysis information to the service control apparatus 20 (S2513). In addition, the external device information analyzing unit 311 updates the external device state information 322 based on the information received from the external device 80, and transmits an update result (external device state information 322 after update or an update difference) to the operation management apparatus 10 (S2514).

Figure 26:
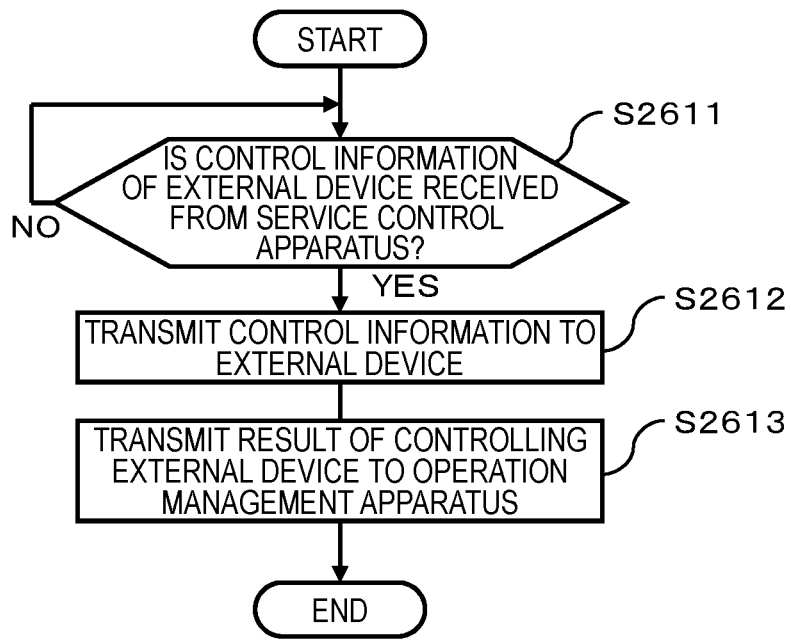
FIG. 26 is a flowchart for describing an external device control processing.

FIG. 26 is a flowchart for describing the external device control processing S2600 performed by the external device control unit 312. Hereinafter, the external device control processing S2600 will be described with reference to FIG. 26.

The external device control unit 312 monitors whether or not control information of the external device is received from the service control apparatus 20 in real time (NO in S2611). When the external device control unit 312 determines that the control information of the external device 80 is received (YES in S2611), the processing proceeds to S2612.

In S2612, the external device control unit 312 transmits the control information to the external device 80.

Next, the external device control unit 312 updates the external device state information 322 based on the control information transmitted to the external device 80, and transmits an update result (external device state information 322 after update or an update difference) to the operation management apparatus 10 (S2613).

Figure 27:
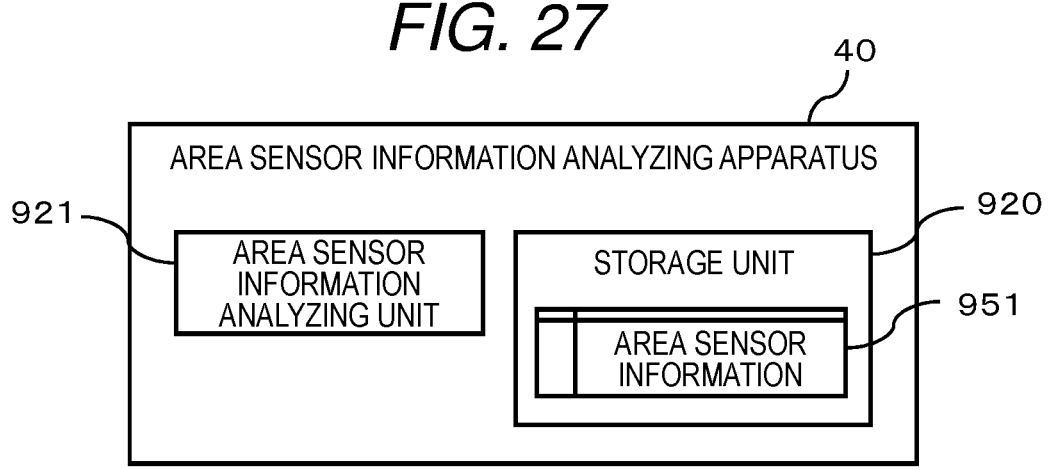
FIG. 27 is a diagram showing main functions of an area sensor information analyzing apparatus.

FIG. 27 shows main functions (software configuration) of the area sensor information analyzing apparatus 40. As shown in FIG. 27, the area sensor information analyzing apparatus 40 includes functions of a storage unit 920 and an area sensor information analyzing unit 921. For example, the processor 101 of the information processing apparatus 100 reads and executes a program stored in the main storage device 102 of the information processing apparatus 100, thereby implementing these functions.

As illustrated in FIG. 27, the storage unit 920 stores area sensor information 951.

Figure 28:
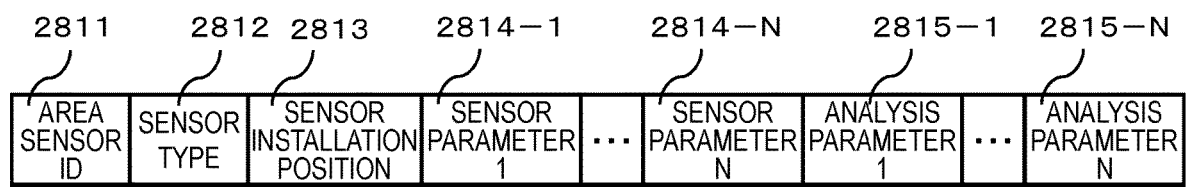
FIG. 28 is a diagram showing a data structure of area sensor information.

FIG. 28 shows a data structure of the area sensor information 951. The area sensor information 951 includes information on the area sensor 90. As shown in FIG. 28, the area sensor information 951 includes items including an area sensor ID 2811, a sensor type 2812, a sensor installation position 2813, sensor parameters 1 to N (reference numerals 2814-1 to 2814-N), and analysis parameters 1 to N (reference numerals 2815-1 to 2815-N).

An identifier (hereinafter, referred to as an area sensor ID) of the area sensor 90 is set as the area sensor ID 2811. Information (hereinafter, referred to as a sensor type) indicating a type of area sensor 90 is set as the sensor type 2812. Information (hereinafter, referred to as a sensor installation position) indicating an installation position of the area sensor 90 represented by a coordinate system (two-dimensional coordinate system or three-dimensional coordinate system) set in the service providing area 2 is set as the sensor installation position 2813.

A list of parameters (sensor parameters 1 to N) used to control the area sensor 90 is set as the sensor parameters 1 to N (reference numerals 2814-1 to 2814-N). A list of parameters (analysis parameters 1 to N) used to analyze sensor information is set as the analysis parameters 1 to N (reference numerals 2815-1 to 2815-N).

Figure 29:
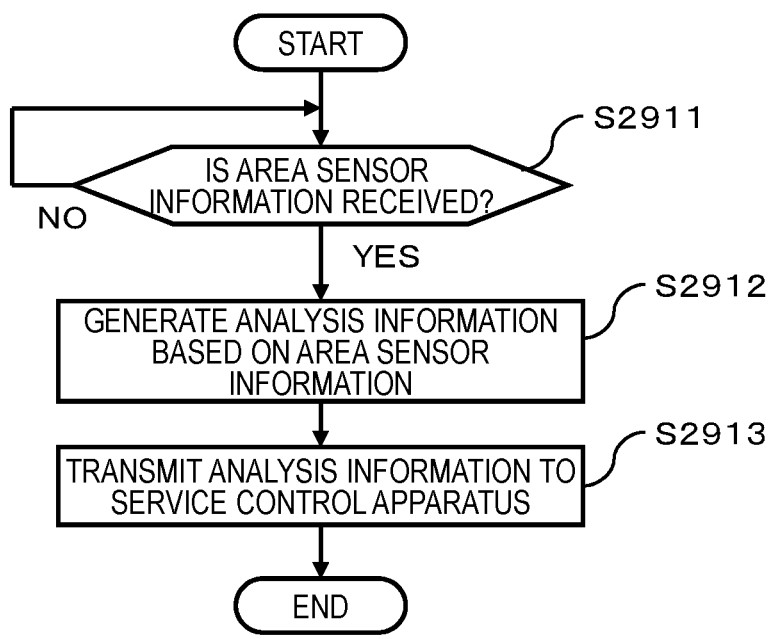
FIG. 29 is a flowchart for describing an area sensor information analyzing processing.

Returning to FIG. 27, the area sensor information analyzing unit 921 performs an area sensor information analyzing processing S2900 shown in FIG. 29.

FIG. 29 is a flowchart for describing the area sensor information analyzing processing S2900 performed by the area sensor information analyzing unit 921. Hereinafter, the area sensor information analyzing processing S2900 will be described with reference to FIG. 29.

The area sensor information analyzing unit 921 monitors whether or not sensor information is received from the area sensor 90 in real time (NO in S2911). When the area sensor information analyzing unit 921 determines that the sensor information is received (YES in S2911), the processing proceeds to S2912.

In S2912, the area sensor information analyzing unit 921 generates analysis information by analyzing the received area sensor information.

Then, the area sensor information analyzing unit 921 transmits the generated analysis information to the service control apparatus 20 (S2913).

Figure 30:
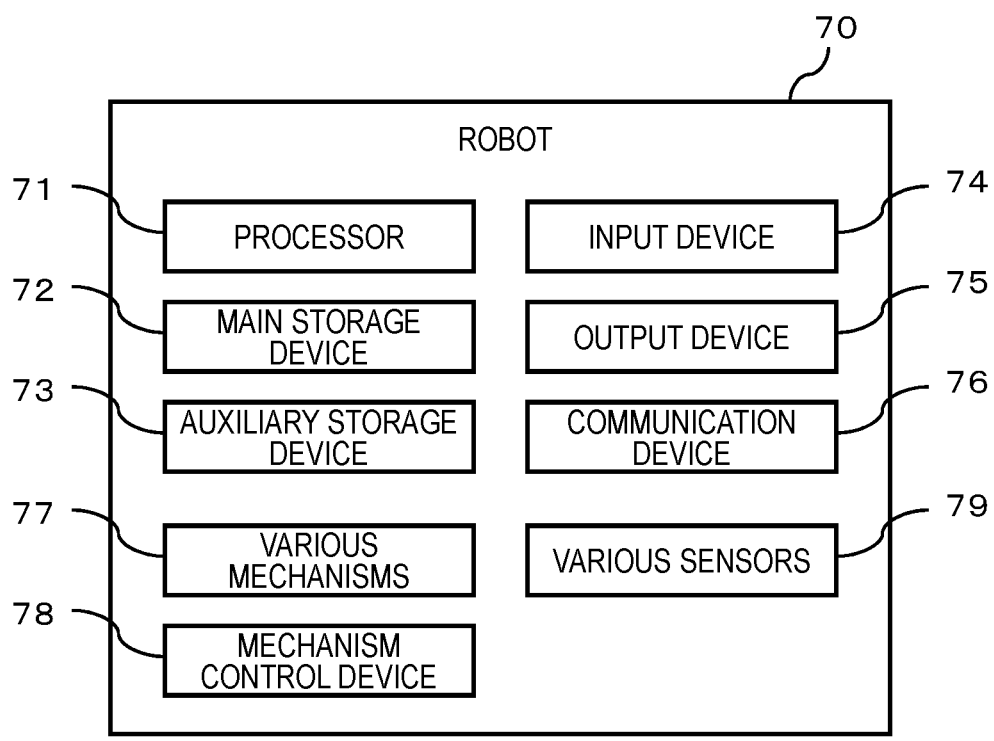
FIG. 30 shows an example of a hardware configuration of a robot.

FIG. 30 shows an example of a hardware configuration of the robot 70. As illustrated in FIG. 30, the robot 70 includes a processor 71, a main storage device 72, an auxiliary storage device 73, an input device 74, an output device 75, and a communication device 76, and functions as an information processing apparatus (computer). Further, the robot 70 includes various mechanisms 77, a mechanism control device 78, and various sensors 79.

The processor 71 is configured by, for example, a CPU, a micro processing unit (MPU), an FPGA, an ASIC, or the like. The main storage device 72 is a device which stores a program or data, and is, for example, a ROM (an SRAM, an NVRAM, a mask ROM, a PROM, or the like), a RAM (a DRAM or the like), or the like. The auxiliary storage device 73 is a hard disk drive, a flash memory, an SSD, an optical storage device (a CD, a DVD, a BD, or the like), or the like. A program or data stored in the auxiliary storage device 73 is frequently read by the main storage device 72.

The input device 74 is a user interface for receiving an input of instruction or information from a user, and is, for example, a keyboard, a mouse, a card reader, a touch panel, or the like. The output device 75 is a user interface for providing information to the user, and is, for example, a display device (an LCD, a light emitting diode (LED), or the like) which visualizes various kinds of information, a sound output device (speaker), a printing device, or the like. The communication device 76 is a communication interface for communicating with another apparatus through the communication network 5, and is, for example, a wireless communication module. In addition, for example, the robot 70 may input or output information to or from another apparatus (a management terminal or a smartphone) via the communication device 76.

The various mechanisms 77 are mechanism portions of the robot 70 such as a head, an arm, a leg, and the like, and include, for example, a servo motor. The mechanism control device 78 controls the various mechanisms 77 in appropriate association with the processor 71 to move the robot 70 or perform provision of a service by the robot 70, or the like. The various sensors 79 are, for example, a camera, a time of flight (TOF) camera, a stereo camera, a laser radar (laser imaging detection and ranging (LIDAR)), a millimeter-wave radar, an infrared depth sensor, an ultrasonic sensor, a temperature sensor, a humidity sensor, and a position sensor (a global positioning system (GPS) or the like).

Figure 31:
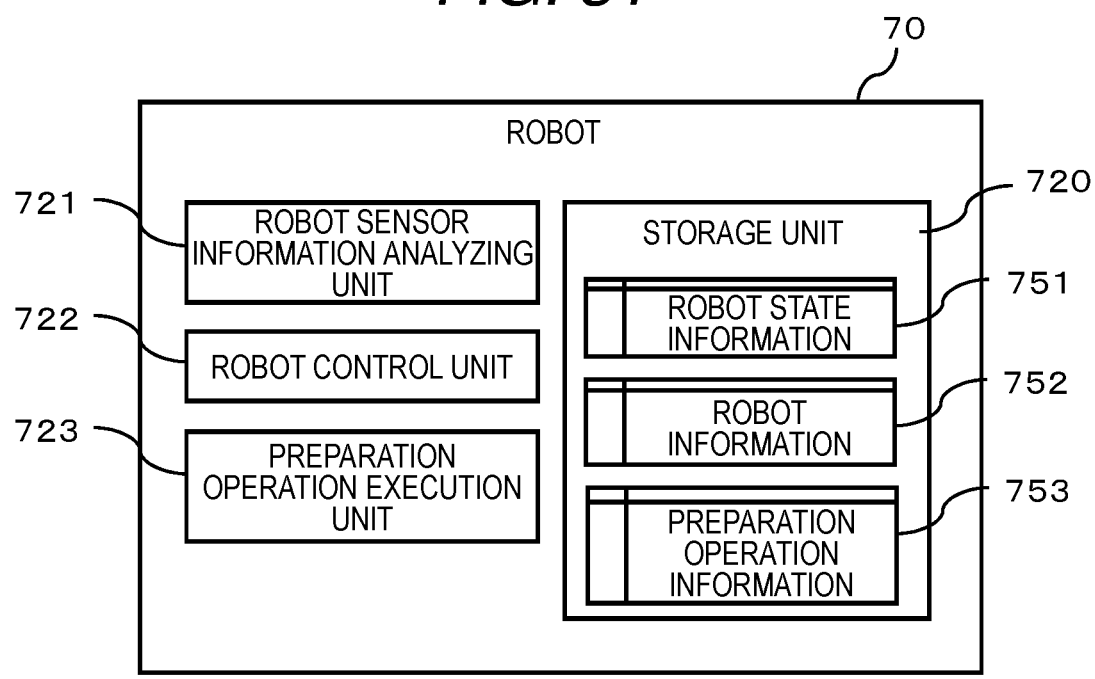
FIG. 31 is a diagram showing main functions of a robot.

FIG. 31 shows main functions (software configuration) of the robot 70. As shown in FIG. 31, the robot 70 includes functions of a storage unit 720, a robot sensor information analyzing unit 721, a robot control unit 722, and a preparation operation execution unit 723. For example, the processor 71 of the robot 70 reads and executes a program stored in the main storage device 72 of the robot 70, thereby implementing these functions.

The storage unit 720 stores robot state information 751, robot information 752, and preparation operation information 753.

Figure 32:
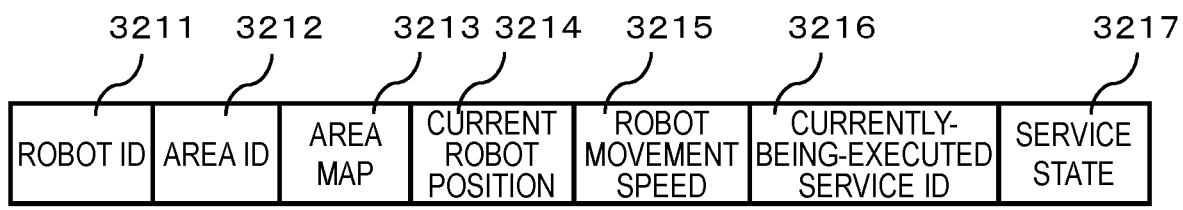
FIG. 32 is a diagram showing a data structure of robot state information.

FIG. 32 shows a data structure of the robot state information 751. As shown in FIG. 32, the robot state information 751 has items including a robot ID 3211, an area ID 3212, an area map 3213, a current robot position 3214, a robot movement speed 3215, a currently-being-executed service ID 3216, and a service state 3217.

A robot ID is set as the robot ID 3211. An area ID of the service providing area 2 in which the robot 70 (hereinafter, referred to as a corresponding robot 70) specified by the robot ID 3211 is present is set as the area ID 3212. The area map described above is set as the area map 3213. Contents of the area map 3213 are initially set when, for example, the robot 70 is installed. The current robot position described above is set as the current robot position 3214. A movement speed (for example, an average movement speed of the robot 70) of the robot 70 is set as the robot movement speed 3215. A service ID of a service (currently-being-executed service) currently being executed by the corresponding robot 70 is set as the currently-being-executed service ID 3216. A service state of the currently-being-executed service is set as the service state 3217.

Figure 33:
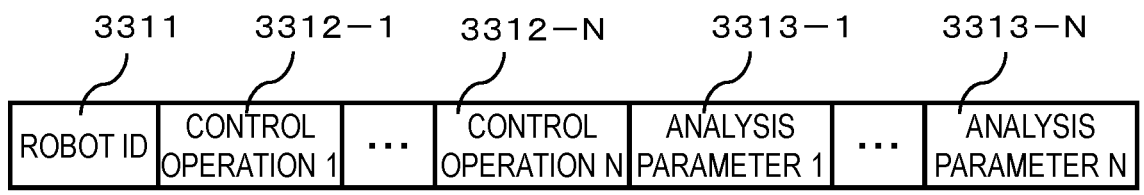
FIG. 33 is a diagram showing a data structure of robot information.

FIG. 33 shows a data structure of the robot information 752. As shown in FIG. 33, the robot information 752 includes items including a robot ID 3311, control operations 1 to N (reference numerals 3312-1 to 3312-N), and analysis parameters 1 to N (reference numerals 3313-1 to 3313-N).

The robot ID described above is set as the robot ID 3311. A list of parameters (control operations 1 to N) used to control the robot 70 is set as the control operations 1 to N (reference numerals 3312-1 to 3312-N). A list of parameters (analysis parameters 1 to N) used by the robot 70 to analyze information (robot sensor information) output from the various sensors 79 is set as the analysis parameters 1 to N (reference numerals 3313-1 to 3313-N).

Figure 34:
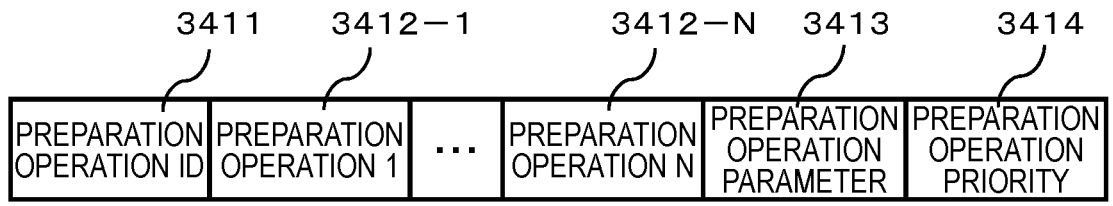
FIG. 34 is a diagram showing a data structure of preparation operation information.

FIG. 34 shows a data structure of the preparation operation information 753. The preparation operation information 753 includes information on a preparation operation executed by each robot 70. As shown in FIG. 34, the preparation operation information 753 includes items including a preparation operation ID 3411, preparation operations 1 to N (reference numerals 3412-1 to 3412-N), a preparation operation parameter 3413, and a preparation operation priority 3414.

An identifier (hereinafter, referred to as a preparation operation ID) of a preparation operation is set as the preparation operation ID 3411. A list (preparation operations 1 to N) of control information of the preparation operation (hereinafter, referred to as a corresponding preparation operation) specified by the preparation operation ID 3411 is set as the preparation operations 1 to N (reference numerals 3412-1 to 3412-N). A parameter (hereinafter, referred to as a preparation operation parameter) used when controlling a preparation operation is set as the preparation operation parameter 3413. A priority (hereinafter, referred to as a preparation operation priority) given to the corresponding preparation operation is set as the preparation operation priority 3414.

Figure 35:
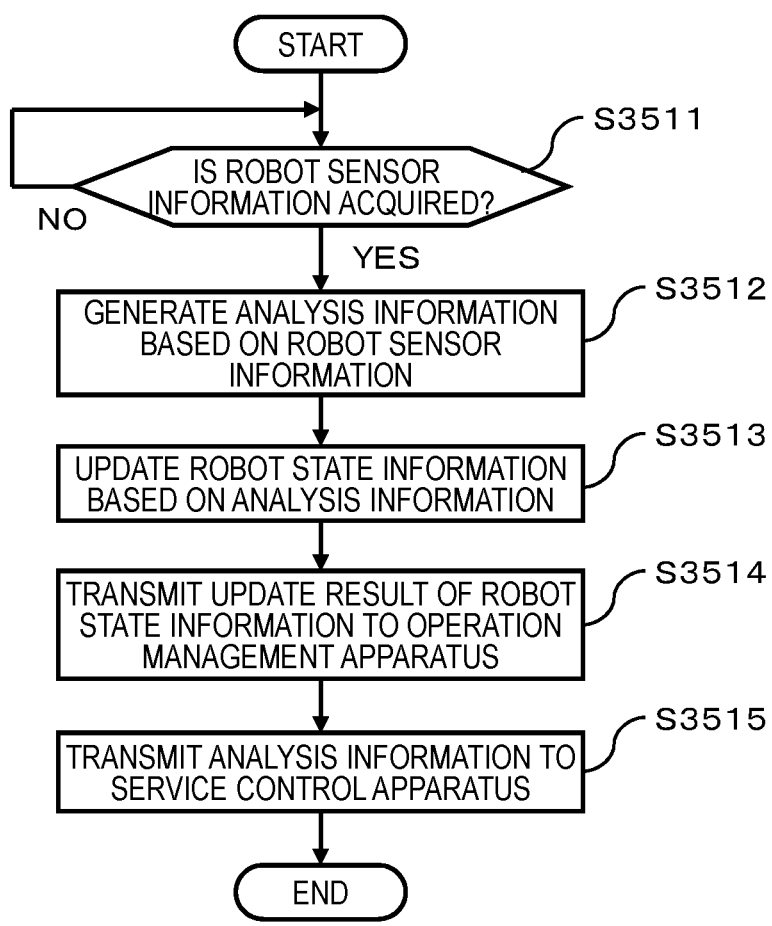
FIG. 35 is a flowchart for describing a robot information analyzing processing.

Returning to FIG. 31, the robot sensor information analyzing unit 721 performs a robot sensor information analyzing processing S3500 shown in FIG. 35. The robot control unit 722 performs a robot control processing S3600 in FIG. 36. The preparation operation execution unit 723 performs a preparation operation execution processing S3700 in FIG. 37.

FIG. 35 is a flowchart for describing the robot sensor information analyzing processing S3500 performed by the robot sensor information analyzing unit 721. Hereinafter, the robot sensor information analyzing processing S3500 will be described with reference to FIG. 35.

The robot sensor information analyzing unit 721 monitors whether or not robot sensor information is acquired from the various sensors 79 in real time (NO in S3511). When the robot sensor information analyzing unit 721 determines that the robot sensor information is acquired (YES in S3511), the processing proceeds to S3512.

In S3512, the robot sensor information analyzing unit 721 generates analysis information by analyzing the acquired robot sensor information.

Next, the robot sensor information analyzing unit 721 updates the robot state information 751 based on the generated analysis information (S3513), and transmits an update result (robot state information 751 after update or an update difference) of the robot state information 751 to the operation management apparatus 10 (S3514).

In addition, the robot sensor information analyzing unit 721 transmits the generated analyzed information to the service control apparatus 20 (S3515).

Figure 36:
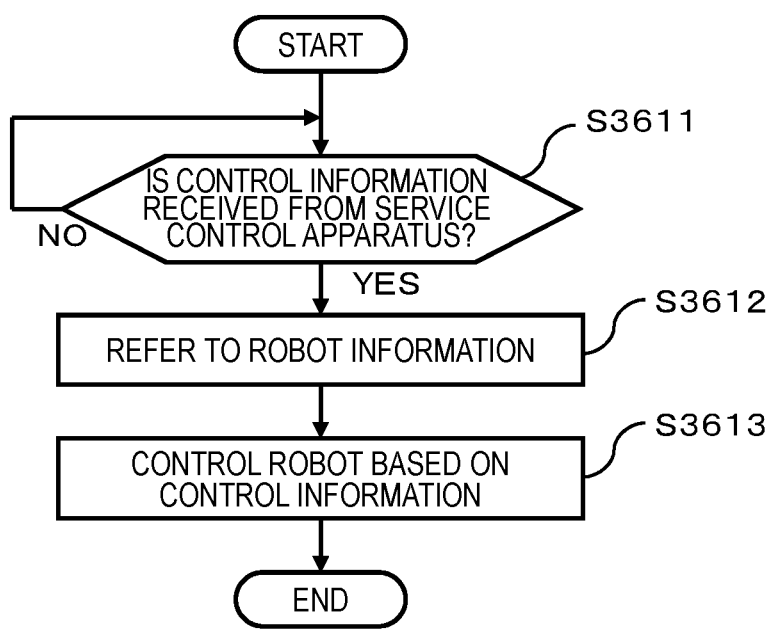
FIG. 36 is a flowchart for describing a robot control processing.

FIG. 36 is a flowchart for describing the robot control processing S3600 performed by the robot control unit 722. Hereinafter, the robot control processing S3600 will be described with reference to FIG. 36.

The robot control unit 722 monitors whether or not control information is received from the service control apparatus 20 in real time (NO in S3611). When the robot control unit 722 determines that the control information is received (YES in S3611), the processing proceeds to S3612.

Then, the robot control unit 722 controls the robot 70 based on the control information (S3613) while referring to the robot information 752 (S3612).

Figure 37:
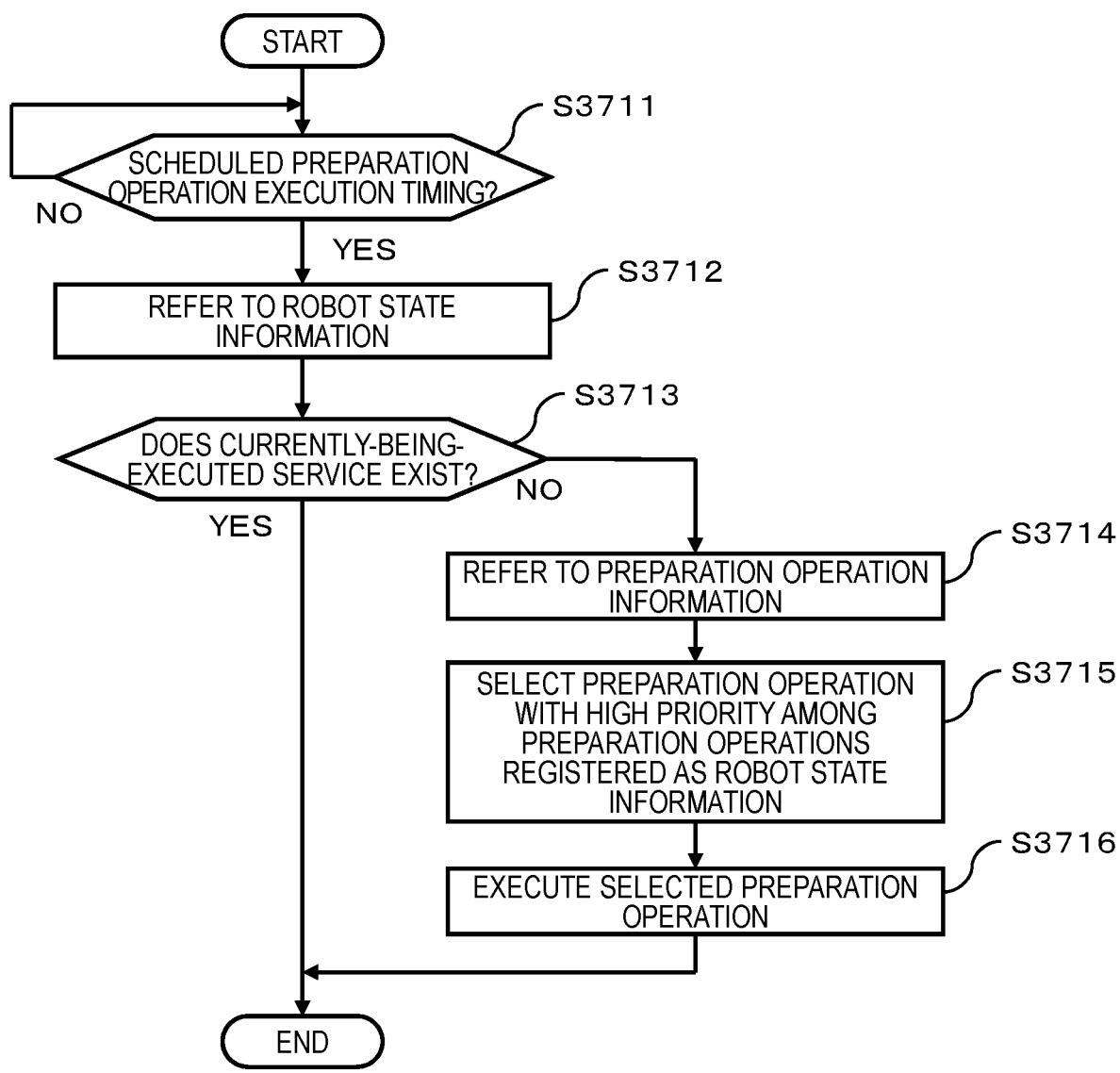
FIG. 37 is a flowchart for describing a preparation operation execution processing.

FIG. 37 is a flowchart for describing the preparation operation execution processing S3700 performed by the preparation operation execution unit 723. Hereinafter, the preparation operation execution processing S3700 will be described with reference to FIG. 37. The preparation operation execution unit 723 executes the preparation operation execution processing S3700, for example, periodically or when the robot state information 751 is updated.

The preparation operation execution unit 723 monitors whether or not a scheduled preparation operation execution timing arrives in real time (NO in S3711). The scheduled preparation operation execution timing arrives, for example, at a preset timing (periodically or the like) or when the robot state information 751 is updated. When the preparation operation execution unit 723 determines that the scheduled preparation operation execution timing arrives (YES in S3711), the processing proceeds to S3712.

In S3712, the preparation operation execution unit 723 determines whether or not a currently-being-executed service exists (S3713) by referring to the robot state information 751 (S3712). When the currently-being-executed service exists (YES in S3713), the preparation operation execution unit 723 ends the preparation operation execution processing S3700. When the currently-being-executed service does not exist (NO in S3713), the processing proceeds to S3714.

In S3714, the preparation operation execution unit 723 refers to the preparation operation information 753 (S3714), selects a preparation operation corresponding to a current state of the robot 70 described in the robot state information 751 (S3715), executes the selected preparation operation (S3716), and ends the preparation operation execution processing S3700. Further, in the selection of the preparation operation, for example, the preparation operation information 753 according to the state of the robot 70 is prepared and a corresponding preparation operation is selected based on the robot state information 751. In addition, when a waiting time of the robot 70 is long and a plurality of preparation operations can be executed, the selection of the preparation operation among the plurality of preparation operations may be performed in a descending order of the preparation operation priority 3414.

Figure 38:
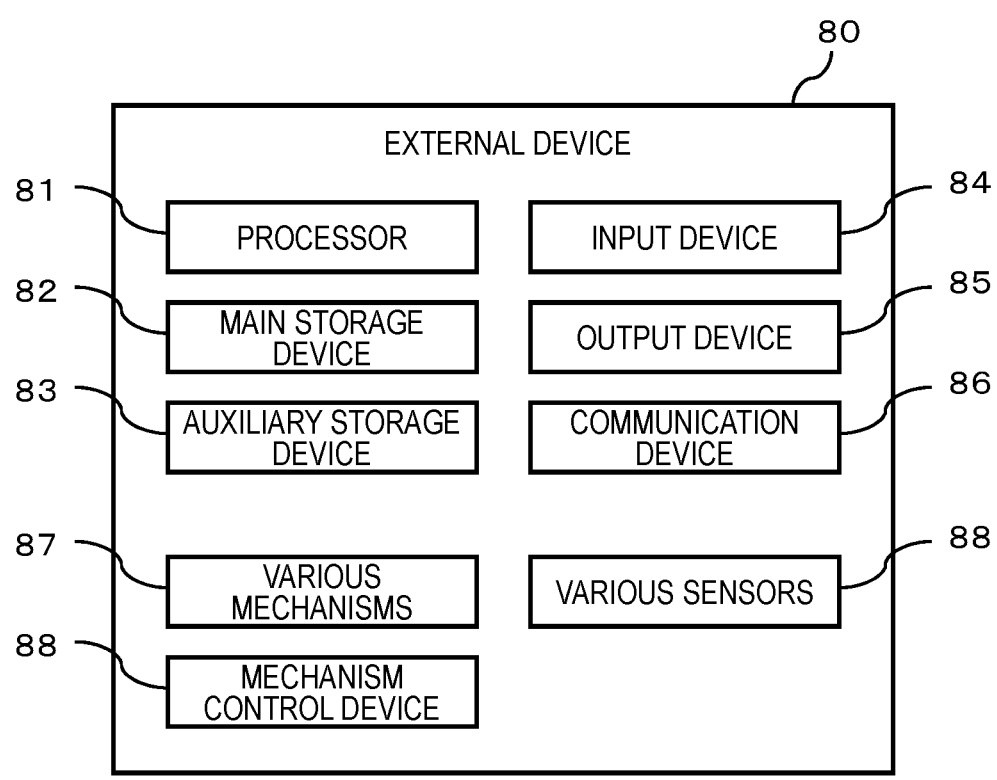
FIG. 38 is a diagram showing an example of a hardware configuration of an external device.

FIG. 38 shows an example of a hardware configuration of the external device 80. As illustrated in FIG. 38, the external device 80 includes a processor 81, a main storage device 82, an auxiliary storage device 83, an input device 84, an output device 85, and a communication device 86, and functions as an information processing apparatus (computer). Further, the external device 80 includes various mechanisms 87, a mechanism control device 88, and various sensors 89. In addition, the external device 80 may have the same configuration as the configuration of the robot 70.

The processor 81 is configured by, for example, a CPU, an MPU, an FPGA, an ASIC, or the like. The main storage device 82 is a device which stores a program or data, and is, for example, a ROM (an SRAM, an NVRAM, a mask ROM, a PROM, or the like), a RAM (a DRAM or the like), or the like. The auxiliary storage device 83 is a hard disk drive, a flash memory, an SSD, an optical storage device (a CD, a DVD, a BD, or the like), or the like. A program or data stored in the auxiliary storage device 83 is frequently read by the main storage device 82.

The input device 84 is a user interface for receiving an input of instruction or information from a user, and is, for example, a keyboard, a mouse, a card reader, a touch panel, or the like. The output device 85 is a user interface for providing information to the user, and is, for example, a display device (an LCD, an LED, or the like) which visualizes various kinds of information, a sound output device (speaker), a printing device, or the like. The communication device 86 is a communication interface for communicating with another apparatus through the communication network 5, and is, for example, a wireless communication module. In addition, for example, the external device 80 may input or output information to or from another apparatus (a management terminal or a smartphone) via the communication device 86.

The various mechanisms 87 are mechanism portions of the external device 80, and include, for example, a mechanical mechanism, a driving force mechanism such as a servo motor, various electronic circuits, or the like. The mechanism control device 88 controls the various mechanisms in appropriate association with the processor 81 to provide the functions of the external device 80. The various sensors 89 are, for example, a camera, a TOF camera, a stereo camera, a laser radar (LIDAR), a millimeter-wave radar, an infrared depth sensor, an ultrasonic sensor, a temperature sensor, a humidity sensor, a light sensor, an infrared sensor, an acceleration sensor, a gyro sensor, a magnetic sensor, or a GPS, a fingerprint sensor, and the like.

Figure 39:
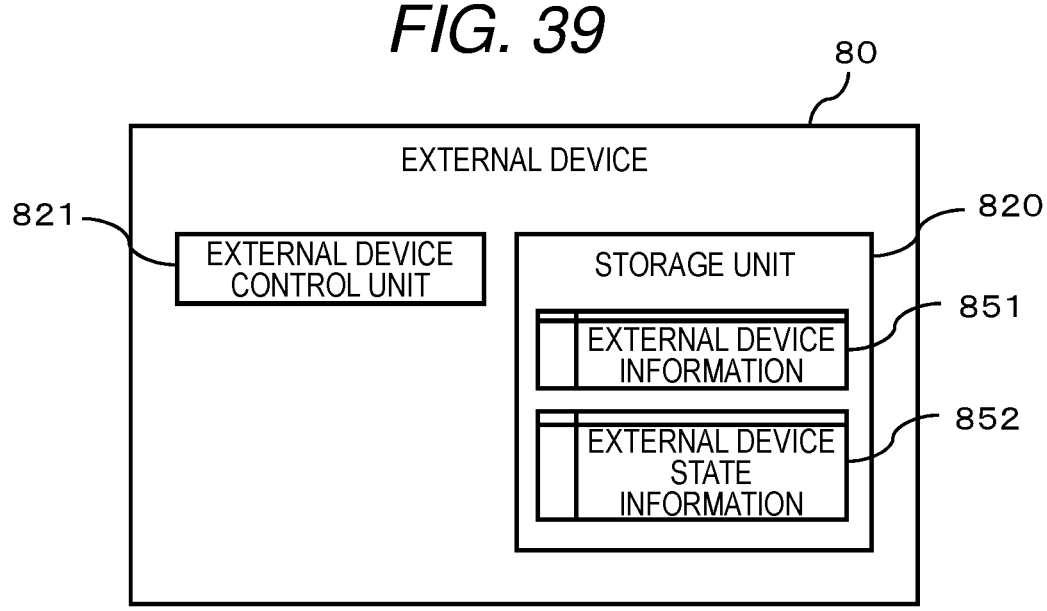
FIG. 39 is a diagram showing main functions of an external device.

FIG. 39 shows main functions (software configuration) of the external device 80. As shown in FIG. 39, the external device 80 includes functions of a storage unit 820 and an external device control unit 821. For example, the processor 81 of the external device 80 reads and executes a program stored in the main storage device 82 of the external device 80, thereby implementing these functions.

The storage unit 820 stores external device information 851 and external device state information 852.

Figure 40:
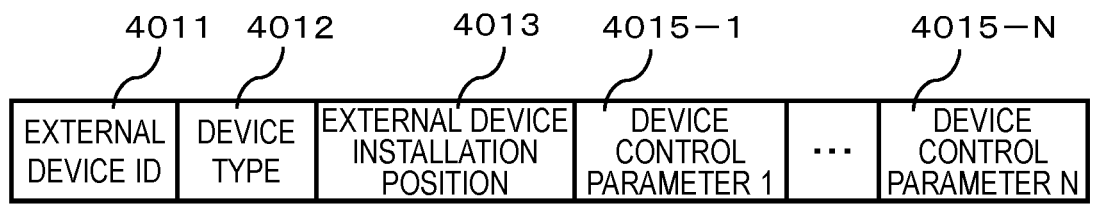
FIG. 40 is a diagram showing a data structure of external device information.

FIG. 40 shows a data structure of the external device information 851. The external device information 851 includes information on the external device 80 which can be used by the robot 70. As shown in FIG. 40, the external device information 851 includes items including an external device ID 4011, a device type 4012, an external device installation position 4013, and device control parameters 1 to N (reference numerals 4015-1 to 4015-N).

An external device ID is set as the external device ID 4011. A type of corresponding external device 80 is set as the device type 4012. An external device installation position of the corresponding external device 80 is set as the external device installation position 4013. A list of parameters (device control parameters 1 to N) used to control the corresponding external device 80 is set as the device control parameters 1 to N (reference numerals 4015-1 to 4015-N).

Figure 41:
FIG. 41 is a diagram showing a data structure of external device state information.

FIG. 41 shows a data structure of the external device state information 852. The external device state information 852 includes information on a state of the external device 80. As shown in FIG. 41, the external device state information 852 includes items including an external device ID 4111, a currently-being-executed service ID 4112, and a service state 4113.

An external device ID is set as the external device ID 4111. A service ID of a service which is currently being executed by the external device 80 (hereinafter, referred to as a corresponding external device 80) specified by the external device ID 4111 is set as the currently-being-executed service ID 4112. A service state of the service currently being executed by the corresponding external device 80 is set as the service state 4113.

Figure 42:
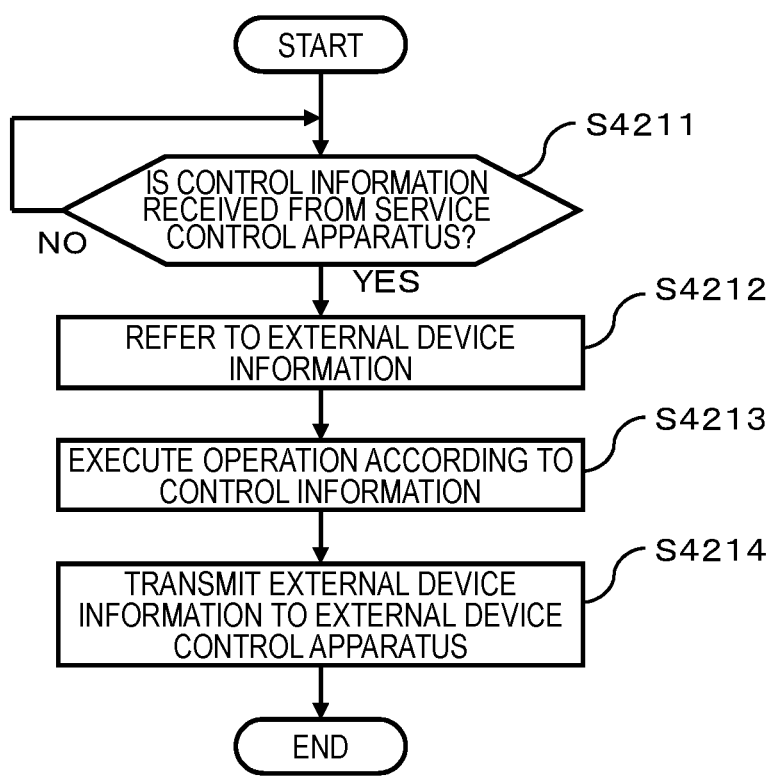
FIG. 42 is a flowchart for describing an external device control processing.

Returning to FIG. 39, the external device control unit 821 performs an external device control processing S4200 shown in FIG. 42.

FIG. 42 is a flowchart for describing the external device control processing S4200 performed by the external device control unit 821. Hereinafter, the external device control processing S4200 will be described with reference to FIG. 42.

The external device control unit 821 monitors whether or not control information is received from the service control apparatus 20 in real time (NO in S4211). When the external device control unit 821 determines that the control information is received (YES in S4211), the processing proceeds to S4212.

Then, the external device control unit 821 executes an operation according to the control information received from the external device control apparatus 30 (S4213) while referring to the external device information 851 (S4212).

Next, the external device control unit 821 updates the external device state information 852 according to the operation of the external device 80, and transmits an update result (external device state information 852 after update or an update difference) to the external device control apparatus 30 (S4214).

Next, an overall flow of the main processings performed in the service providing system 1 will be described with reference to sequence diagrams.

Figure 43:
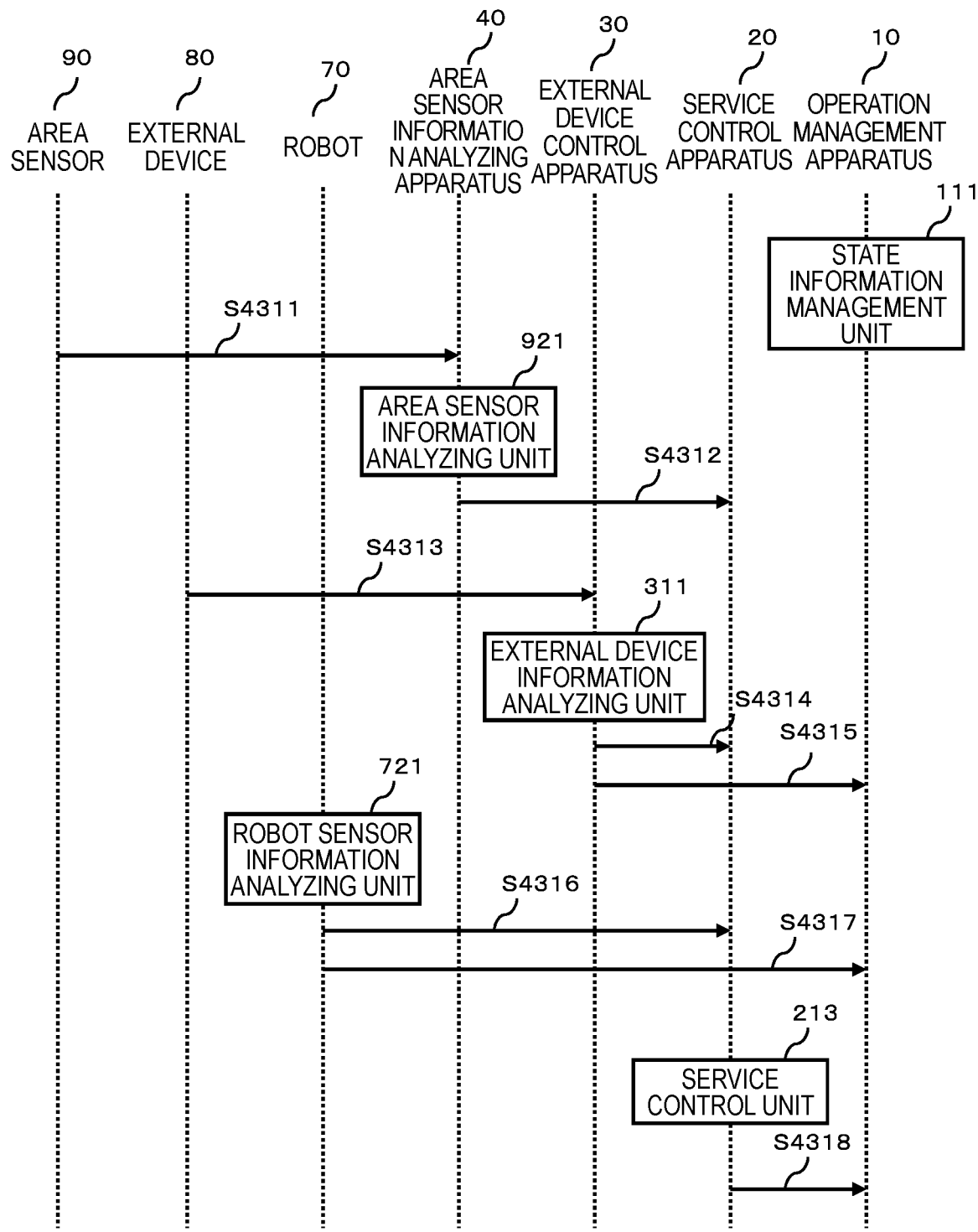
FIG. 43 is a sequence diagram for describing a state information update sequence.

FIG. 43 is a sequence diagram for describing a flow (hereinafter, referred to as a state information update sequence S4300) of a processing in the service providing system 1 when the state information management unit 111 of the operation management apparatus 10 performs the state information update processing S1000. Hereinafter, the state information update sequence S4300 will be described with reference to FIG. 43.

As shown in FIG. 43, the area sensor information analyzing unit 921 of the area sensor information analyzing apparatus 40 receives area sensor information from the area sensor 90 via the communication network 5 (S4311), generates analysis information by analyzing the received area sensor information, and transmits the generated analysis information to the service control apparatus 20 (S4312).

The external device information analyzing unit 311 of the external device control apparatus 30 receives external device information from the external device 80 via the communication network 5 (S4313), generates analysis information by analyzing the received external device information, and transmits the generated analysis information to the service control apparatus 20 (S4314). In addition, the external device information analyzing unit 311 updates the external device state information 332 based on the received information, and transmits an update result (external device state information 332 after update or an update difference) to the operation management apparatus 10 (S4315). The state information management unit 111 of the operation management apparatus 10 receives the update result and updates the external device state information 136.

The robot sensor information analyzing unit 721 of the robot 70 generates analysis information based on information acquired from the various sensors 79, and transmits the generated analysis information to the service control apparatus 20 (S4316). In addition, the robot sensor information analyzing unit 721 updates the robot state information 751 based on the information, and transmits an update result (robot state information 751 after update or an update difference) to the operation management apparatus 10 (S4317). The state information management unit 111 of the operation management apparatus 10 receives the update result and updates the robot state information 131.

The service control unit 213 of the service control apparatus 20 receives analysis information transmitted from each of the area sensor information analyzing apparatus 40, the external device control apparatus 30, and the robot 70, generates service trigger information based on the received analysis information, and transmits the generated service trigger information to the operation management apparatus 10 (S4318). The state information management unit 111 of the operation management apparatus 10 receives the update result and updates the service trigger information 134.

FIG. 44 is a sequence diagram for describing a flow (hereinafter, referred to as a service execution sequence S4400) of a processing in the service providing system 1 when the service selection unit 112 of the operation management apparatus 10 selects a service trigger (service) and the robot 70 executes the selected service. Hereinafter, the service execution sequence S4400 will be described with reference to FIG. 44.

The service selection unit 112 of the operation management apparatus 10 executes the service selection processing S1100, and transmits control information of the service to the service control apparatus 20 in a case of controlling the robot 70 (S4411).

When the control information of the service transmitted form the operation management apparatus 10 is received, the service control unit 213 of the service control apparatus 20 transmits the control information to the robot 70 or the external device control apparatus 30 (S4412 and S4413).

The robot control unit 722 of the robot 70 receives the control information transmitted from the service control apparatus 20 and controls the robot 70 according to the received control information.

The external device control apparatus 30 receives the control information transmitted from the service control apparatus 20 and transmits a control command to the external device 80 according to the received control information (S4414). The external device 80 executes an operation based on the control command received from the external device control apparatus 30.

Although the present disclosure has been described with reference to example embodiments, those skilled in the art will recognize that various changes and modifications may be made in form and detail without departing from the spirit and scope of the claimed subject matter.

For example, the embodiment described above has been described in detail in order to facilitate understanding of the present invention, and the present invention is not necessarily limited to including all the configurations described above. Further, it is possible to add, delete, and replace other configurations with respect to a part of the configuration of the embodiment.

In addition, some or all of the above-described components, functional units, processing units, processing means, and the like may be implemented by hardware, for example, by designing them as, for example, an integrated circuit. Further, each of the above-described configurations, functions, and the like may be implemented by software by interpreting and executing a program that a processor realizes each function. Information such as programs for realizing each function, tables, files, and the like can be stored in a memory, a recording device such as a hard disk or an SSD, or a recording medium such as an IC card, an SD card, or a DVD.

In addition, a control line or an information line considered to be necessary for description is shown in the respective drawings, and not all the control lines or information lines for installation are necessarily shown. For example, in practice, it may be considered that almost all the components are mutually connected.

In addition, a form of disposition of the functional units, processing units, databases of the service providing system 1 described above is only an example. The form of disposition of the functional units, processing units, databases can be changed to the optimum disposition form in terms of performance of hardware or software included in the service providing system 1, a processing efficiency, a communication efficiency, and the like.

Further, a configuration (schema or the like) of a database in which various data are stored described above can be flexibly changed in terms of efficient utilization of a resource, improvement of a processing efficiency, improvement of an access efficiency, improvement of a retrieval efficiency, and the like.

What is claimed is:

1. A service providing system, comprising:
one or more robots which execute a service; and
an information processing apparatus which is communicably connected to the robots,
wherein the information processing apparatus includes:
a processor and a memory, the memory storing instructions that when executed by the processor configure the processor to:
acquire, from the robot, robot state information as information indicating a state of the robot,
acquire analysis information that is based on information acquired in an area in which the robot provides the service,
store service information indicating information about the service,
acquire a plurality of service triggers which are each information indicating a trigger for executing respectively corresponding services based on the analysis information,
for each of services corresponding to the plurality of service triggers:
  obtain a current speed and current position of the robot;
  acquire a position at which a service respectively corresponding to a service trigger is to be executed,
  calculate a distance from the robot to the position at which the service respectively corresponding to the service trigger is to be executed, and
  calculate a time required for the robot to travel the distance,
calculate a service effect for each of the services respectively corresponding to the service triggers based on the time required for the robot to travel the distance and a time required to execute each service respectively corresponding to the plurality of service triggers, the service effect being an effect of the service corresponding to each of a plurality of service triggers,
select a service trigger, among the plurality of service triggers, based on a respectively corresponding service having a greatest service effect, and
cause the robot as a service execution subject to execute the service corresponding to the selected service trigger.

2. The service providing system according to claim 1,
wherein the service information includes a service priority as information indicating an execution priority of the corresponding service, and
wherein the processor is configured to calculate a service effect based on the service priority of the service corresponding to the service trigger.

3. The service providing system according to claim 1,
wherein the analysis information is acquired by analyzing at least any one of information acquired from a sensor provided in the area, information acquired from the robot, and information acquired from an external device as a device by which the service is executable in the area.

4. The service providing system according to claim 1,
wherein the processor is configured to in causing the robot as the service execution subject to execute the service corresponding to the selected service trigger, when the robot is currently executing another service, cause the robot or an external device as a device by which the service is executable in the area to execute an alternative service for the another service.

5. The service providing system according to claim 1,
wherein the processor is configured to in causing the robot as the service execution subject to execute the service corresponding to the selected service trigger, when the robot is currently executing another service, decrease an execution time of the currently-being-executed service.

6. The service providing system according to claim 1,
wherein the processor is configured to in causing the robot as the service execution subject to execute the service corresponding to the selected service trigger, when the robot is currently executing another service, stop the currently-being-executed service.

7. The service providing system according to claim 1,
wherein the processor is configured to in causing the robot as the service execution subject to execute the service corresponding to the selected service trigger, when the robot is currently executing another service, determine an influence caused by stopping the currently-being-executed service and continue the execution of the another service when the influence exceeds a preset threshold value.

8. The service providing system according to claim 1,
wherein the service information includes a service priority as information indicating an execution priority of the corresponding service, and
wherein the processor is configured to in causing the robot as the service execution subject to execute the service corresponding to the selected service trigger, when the robot is executing another service and a service priority of the service corresponding to the selected service trigger is lower than a service priority of the another service, cause the robot to continue the execution of the another service.

9. The service providing system according to claim 1,
wherein the robot executes a preparation operation for executing the service in a period in which the service is not executed.

10. An information processing apparatus communicably connected to one or more robots which execute a service, the information processing apparatus comprising:
- a processor and a memory, the memory storing instructions that when executed by the processor configure the processor to:
- acquire, from the robot, robot state information as information indicating a state of the robot;
- acquire analysis information as information based on information acquired in an area in which the robot provides the service;
- store service information as information on the service;
- acquire a plurality of service triggers which are information indicating a trigger for executing respectively corresponding services based on the analysis information;
- for each of services corresponding to the plurality of service triggers:
  - obtain a current speed and current position of the robot;
  - acquire a position at which a service respectively corresponding to a service trigger is to be executed,
  - calculate a distance from the robot to the position at which the service respectively corresponding to the service trigger is to be executed, and
  - calculate a time required for the robot to travel the distance,
- calculate a service effect for each of the services respectively corresponding to the service triggers based on the time required for the robot to travel the distance and a time required to execute each service respectively corresponding to the plurality of service triggers, the service effect being an effect of the service corresponding to each of a plurality of service triggers;
- select a service trigger, among the plurality of service triggers, based on a respectively corresponding service having a greatest service effect; and
- cause the robot as a service execution subject to execute the service corresponding to the selected service trigger.

11. The information processing apparatus according to claim 10,
- wherein the service information includes a service priority as information indicating an execution priority of the corresponding service, and
- wherein the processor is configured to calculate a service effect based on the service priority of the service corresponding to the service trigger.

12. The information processing apparatus according to claim 10,
- wherein the analysis information is acquired by analyzing at least any one of information acquired from a sensor provided in the area, information acquired from the robot, and information acquired from an external device as a device by which the service is executable in the area.

13. The information processing apparatus according to claim 10,
- wherein the processor is configured to in causing the robot as the service execution subject to execute the service corresponding to the selected service trigger, when the robot is currently executing another service, cause the robot or an external device as a device by which the service is executable in the area to execute an alternative service for the another service.

14. A method of controlling a service providing system including an information processing apparatus communicably connected to one or more robots which execute a service, the method of controlling a service providing system, comprising the following steps executed by the information processing apparatus:
- acquiring, from the robot, robot state information as information indicating a state of the robot;
- acquiring analysis information that is based on information acquired in an area in which the robot provides the service;
- storing service information indicating information about the service;
- acquiring a plurality of service triggers which are each information indicating a trigger for executing respectively corresponding services based on the analysis information;
- for each of services corresponding to the plurality of service triggers:
  - obtaining a current speed and current position of the robot;
  - acquiring a position at which a service respectively corresponding to a service trigger is to be executed,
  - calculating a distance from the robot to the position at which the service respectively corresponding to the service trigger is to be executed, and
  - calculating a time required for the robot to travel the distance,
- calculating a service effect for each of the services respectively corresponding to the service triggers based on the time required for the robot to travel the distance and a time required to execute each service respectively corresponding to the plurality of service triggers, the service effect being an effect of the service corresponding to each of a plurality of service triggers;
- selecting a service trigger, among the plurality of service triggers, based on a respectively corresponding service having a greatest service effect; and
- causing the robot as a service execution subject to execute the service corresponding to the selected service trigger.

* * * * *